United States Patent
Jo et al.

(10) Patent No.: US 11,303,349 B2
(45) Date of Patent: Apr. 12, 2022

(54) RESOURCE USE METHOD OF NODE IN WIRELESS COMMUNICATION SYSTEM AND DEVICE USING SAME

(71) Applicant: LG Electronics Inc., Seoul (KR)

(72) Inventors: Soonki Jo, Seoul (KR); Huayue Song, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/639,530

(22) PCT Filed: Aug. 7, 2019

(86) PCT No.: PCT/KR2019/009889
§ 371 (c)(1),
(2) Date: Feb. 14, 2020

(87) PCT Pub. No.: WO2020/032578
PCT Pub. Date: Feb. 13, 2020

(65) Prior Publication Data
US 2021/0367660 A1    Nov. 25, 2021

(30) Foreign Application Priority Data

Aug. 7, 2018  (KR) .................. 10-2018-0091846
Nov. 2, 2018  (KR) .................. 10-2018-0133757

(51) Int. Cl.
*H04W 72/04*  (2009.01)
*H04W 72/02*  (2009.01)
(Continued)

(52) U.S. Cl.
CPC ....... *H04B 7/15542* (2013.01); *H04L 5/0092* (2013.01); *H04W 72/0406* (2013.01);
(Continued)

(58) Field of Classification Search
CPC .......... H04W 72/042; H04W 72/0446; H04W 72/0413; H04W 72/04; H04W 72/1289;
(Continued)

(56) References Cited

U.S. PATENT DOCUMENTS

2013/0188590 A1* 7/2013 Aiba .................. H04W 72/04
                                                      370/329
2018/0092139 A1   3/2018 Novlan et al.
(Continued)

FOREIGN PATENT DOCUMENTS

KR  1020140077327   6/2014
WO  WO2018/084952   5/2018

OTHER PUBLICATIONS

Qualcomm Incorporated, "IAB topology adaptation for architecture group 1", R3-183731, 3GPP TSG-RAN WG3 Meeting #AH1807, Montreal, Canada, Jul. 2-6, 2018, 8 pages.
(Continued)

*Primary Examiner* — Sai Aung
(74) *Attorney, Agent, or Firm* — Fish & Richardson P.C.

(57) ABSTRACT

The method includes receiving first allocation information related to communication with a parent node and second allocation information related to communication with a child node and communicating with the parent node or the child node using a particular resource based on the first allocation information and the second allocation information. The first allocation information indicates a resource type of the particular resource as one of three resource types, the second allocation information indicates the resource type of the particular resource as one of seven resource types. When the second allocation information indicates the particular resource as a soft downlink, soft uplink, or soft flexible resource and when it is not explicitly indicated that the particular resource is available for the communication with the child node, the particular resource is used for the communication with the parent node.

14 Claims, 26 Drawing Sheets

(51) Int. Cl.
  H04B 7/155    (2006.01)
  H04L 5/00     (2006.01)
  H04W 72/08        (2009.01)
  H04L 5/16         (2006.01)
  H04L 5/14         (2006.01)

(52) U.S. Cl.
  CPC ....... H04W 72/0493 (2013.01); *H04L 5/1438* (2013.01); *H04L 5/16* (2013.01); *H04W 72/082* (2013.01)

(58) Field of Classification Search
  CPC . H04W 72/0453; H04W 24/10; H04W 72/12; H04W 56/001
  See application file for complete search history.

(56) References Cited

U.S. PATENT DOCUMENTS

| | | | |
|---|---|---|---|
| 2018/0192412 A1 | 7/2018 | Novlan et al. | |
| 2019/0090126 A1* | 3/2019 | Hayashi | H04W 72/0446 |
| 2020/0163062 A1* | 5/2020 | Takeda | H04L 5/0053 |
| 2020/0245351 A1* | 7/2020 | Takeda | H04W 72/1289 |
| 2021/0099979 A1* | 4/2021 | Takeda | H04W 52/02 |
| 2021/0153202 A1* | 5/2021 | Takeda | H04W 72/0493 |

OTHER PUBLICATIONS

Qualcomm Incorporated, "Resource Coordination across IAB Topology", R2-1808007, 3GPP TSG-RAN WG2 Meeting #102, Busan, South Korea, May 21-25, 2018, 6 pages.

Vivo, "Discussion on IAB node access and resource allocation", R2-1809864, 3GPP TSG-RAN WG2 NR AH1807 Meeting, Montreal, Canada, Jul. 2-6, 2018, 3 pages.

Ericsson, "Updated summary of 7.2.3.1 Enhancements to support NR backhaul links," R1-1812042, 3GPP TSG RAN WG1 Meeting #94bis, Chengdu, China, Oct. 8-12, 2018, 22 pages.

European Extended Search Report in European Patent Appln. No. 19842851.8, dated Oct. 9, 2020, 10 pages.

Huawei, HiSilicon, "Physical layer enhancement on IAB," RI-1803695, 3GPP TSG RAN WG1 Meeting #92bis, Sanya, China, Apr. 16-20, 2018, 6 pages.

Intel Corporation, "Overview on RAN1 related issues in IAB," RI-1804755, 3GPP TSG RAN WG1 #92bis, Sanya, China, Apr. 16-20, 2018, 15 pages.

Korean Notice of Allowance in Korean Patent Appln. No. 19842851.8, dated Aug. 28, 2020, 6 pages.

Nokia, Nokia Shanghai Bell, "Dynamic resource allocation between backhaul and access links," RI-1806662, 3GPP TSG RAN WG1 Meeting #93, Busan, Korea, May 21-25, 2018, 6 pages.

Qualcomm Incorporated, "IAB resource partitioning for architecture group 1," R2-1808006, 3GPP TSG RAN WG2 Meeting #102, Busan, South Korea, May 21-25, 2018, 3 pages.

ZTE, "Discussion on IAB node resource allocation," R2-1810215, 3GPP TSG-RAN WG2 NR AdHoc 1807, Montreal, Canada, Jul. 2-6, 2018, 4 pages.

ZTE, "Overview of physical layer enhancements for IAB," RI-1806024, 3GPP TSG RAN WG1 Meeting #93, Busan, Korean, May 21-25, 2018, 9 pages.

* cited by examiner

FIG. 23

Resource type for MT-aspect: D (MT-D), U (MT-U), F (MT-F)

(a)

Resource type for DU-aspect: H-D, H-U, H-F, N/A, S-D, S-U, S-F (b)

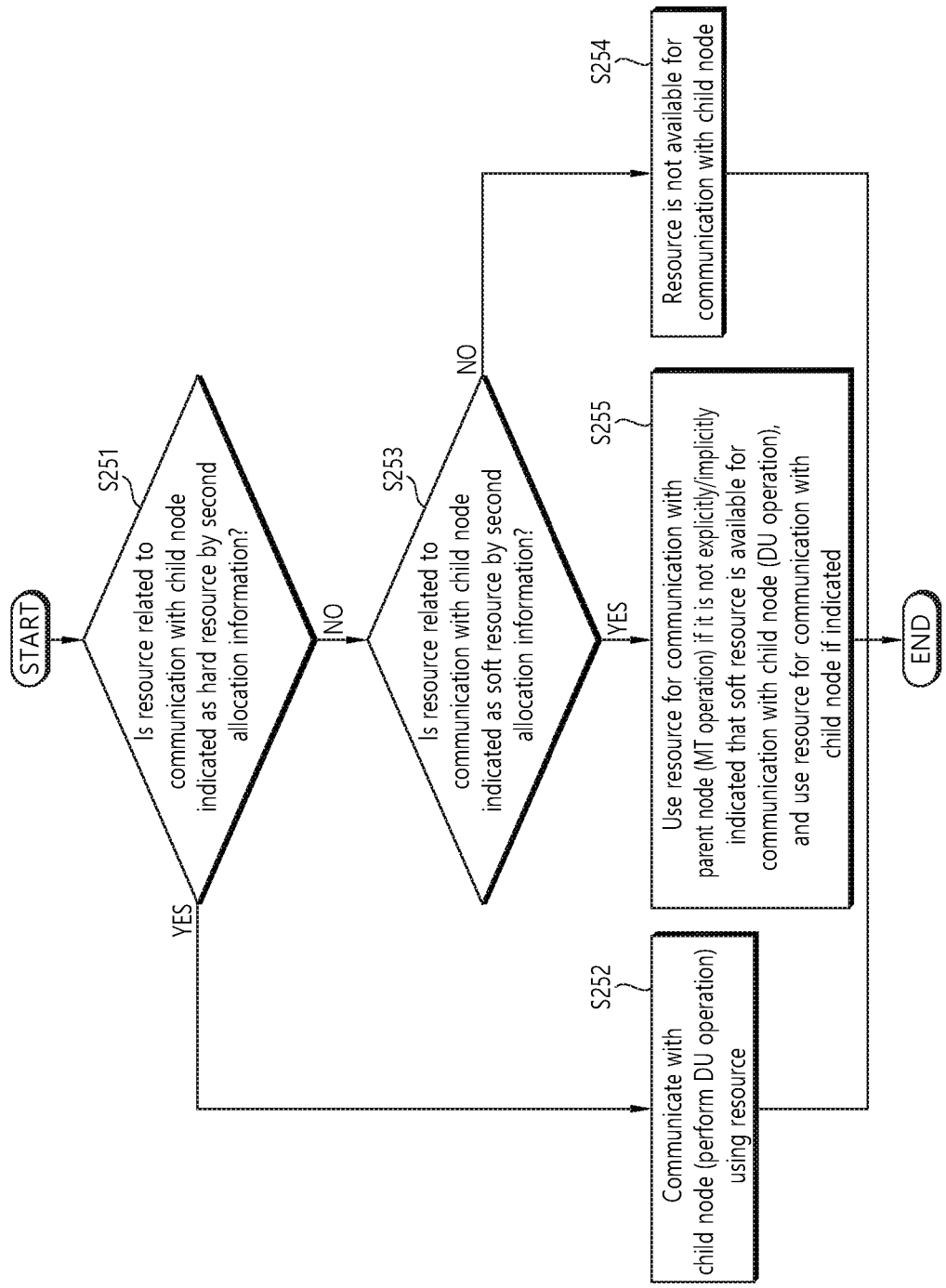

RESOURCE USE METHOD OF NODE IN WIRELESS COMMUNICATION SYSTEM AND DEVICE USING SAME

CROSS-REFERENCE TO RELATED APPLICATIONS

This application is a National Stage application under 35 U.S.C. § 371 of International Application No. PCT/KR2019/009889, filed on Aug. 7, 2019, which claims the benefit of Korean Patent Application Nos. 10-2018-0091846, filed on Aug. 7, 2018 and 10-2018-0133757, filed on Nov. 2, 2018. The disclosures of the prior applications are incorporated by reference in their entirety.

BACKGROUND OF THE DISCLOSURE

Field of the Disclosure

The disclosure relates to wireless communication and, more particularly, to a resource use method of a node in a wireless communication system and a device using the same.

Related Art

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications.

Further, designs for communication systems considering services/user equipments (UEs) sensitive to reliability and latency are under discussion. The introduction of next-generation RAT considering enhanced mobile broadband (eMBB) communication, massive MTC, and ultra-reliable and low-latency communication (URLLC) is being discussed. In this disclosure, for convenience, this technology is referred to as new RAT or new radio (NR). NR is also referred to as a fifth-generation (5G) system.

In future wireless communication systems, such as NR, a bandwidth part (BWP) may be introduced. A bandwidth part may be used to allocate part of a band for a UE that is difficult to support a broadband in a wireless communication system using the broadband.

A wider bandwidth may be used in NR than in Long-Term Evolution (LTE). Further, in NR, massive multiple-input and multiple-output (MIMO) and a multibeam may be used.

In NR, the introduction of integrated access and backhaul (IAB) is taken into consideration due to a need for higher data rate and higher capacity. Here, access may be used to refer to, for example, a base station-UE connection, and backhaul may be used to refer to, for example, a base station-base station or base station-core network connection. NR may use different radio resources/radio channels for access and backhaul but is also considering using the same radio resource and/or radio channel. For example, radio resources and radio channels that a first base station use to serve UEs connected through an access link may be used for a backhaul link between a first base station and a second base station.

Terms, such as a base station and a UE, are used for convenience and may be replaced with other terms, for example, a node. For example, it is assumed that a second base station controls/schedules a UE connected to a first base station through an access link via a backhaul link with the first base station. In this case, for the first base station, the second base station may be referred to as a parent node or a donor node, and the UE may be referred to as a child node. The first base station may be referred to as a relay node or an IAB node.

In an IAB environment, an IAB node may operate like a mobile terminal (MT) in a relationship with a parent node, and may operate like a distributed unit (DU), that is, a base station, in a relationship with a child node. Accordingly, for resource allocation for the IAB node, resource allocation in terms of the MT and resource allocation in terms of the DU may be performed.

However, when these two resource allocations are made, different resource use methods/directions may be given to a specific resource. In this case, a method for determining a resource use method may be an issue.

SUMMARY OF THE DISCLOSURE

An aspect of the disclosure is to provide an operating method of anode in a wireless communication system and a device using the same.

In one aspect, provided is a resource use method of anode in a wireless communication system. The method includes receiving first allocation information related to communication with a parent node and second allocation information related to communication with a child node and communicating with the parent node or the child node using a particular resource based on the first allocation information and the second allocation information. The first allocation information informs a resource type of the particular resource as one of three resource types and the second allocation information informs the resource type of the particular resource as one of seven resource types. Based on the second allocation information informing the particular resource as a soft downlink, soft uplink, or soft flexible resource and based on no explicit indication that the particular resource is available for the communication with the child node, the particular resource is used for the communication with the parent node.

The first allocation information may inform that the resource type of the particular resource is one of downlink, uplink, and flexible.

The second allocation information may inform that the resource type of the particular resource is one of hard downlink, soft downlink, hard uplink, soft uplink, hard flexible, soft flexible, and not-available.

The hard downlink may indicate that the particular resource is a resource that is always available for the node to transmit a signal to the child node, and the soft downlink may indicate that the particular resource is a resource through which transmission of a signal by the node to the child node is controlled by the parent node.

The hard uplink may indicate that the particular resource is a resource that is always available for the node to receive a signal from the child node, and the soft uplink may indicate that the particular resource is a resource through which reception of a signal by the node from the child node is controlled by the parent node.

The hard flexible may indicate that the particular resource is a resource that is always flexible in a relationship between the node and the child node, and the soft flexible may indicate that the particular resource is a resource of which the flexibility in the relationship between the node and the child node is controlled by the parent node.

The not-available may indicate that the particular resource is a resource that is unavailable in a relationship between the node and the child node.

When the second allocation information informs the resource as a soft downlink, soft uplink, or soft flexible resource and the resource is allocated to the node by the first allocation information, the resource may be considered to be used for the communication with the parent node.

When the second allocation information informs the resource as a soft downlink, soft uplink, or soft flexible resource and the resource is not allocated to the node by the first allocation information, the resource may be considered to be used for the communication with the child node.

The first allocation information and the second allocation information may be received from the parent node.

The child node may be a UE connected to the node.

When the second allocation information informs the particular resource as a hard resource that is always available for communication with the child node, the particular resource may be used for the communication with the child node regardless of the first allocation information In another aspect, provided is a node. The node includes a transceiver to transmit and receive a radio signal and a processor coupled with the transceiver to operate. The processor receives first allocation information related to communication with a parent node and second allocation information related to communication with a child node and communicates with the parent node or the child node using a particular resource based on the first allocation information and the second allocation information. The first allocation information informs a resource type of the particular resource as one of three resource types and the second allocation information informs the resource type of the particular resource as one of seven resource types. Based on the second allocation information informing the particular resource as a soft downlink, soft uplink, or soft flexible resource and based on no explicit indication that the particular resource is available for the communication with the child node, the particular resource is used for the communication with the parent node.

In still another aspect, provided is an operating method of a parent node in a wireless communication system. The method includes transmitting first allocation information related to communication with a node and second allocation information related to communication with a child node of the node and the node and communicating with the node using a particular resource based on the first allocation information and the second allocation information. The first allocation information informs a resource type of the particular resource as one of three resource types and the second allocation information informs the resource type of the particular resource as one of seven resource types. Based on the second allocation information informing the particular resource as a soft downlink, soft uplink, or soft flexible resource and based on no explicit indication that the particular resource is available for the communication with the child node, the particular resource is used for the communication with the parent node.

According to the disclosure, it is possible to use a specific resource without ambiguity even when resource allocation for an access link and resource allocation for a backhaul link with respect to the specific resource do not indicate the same resource direction or resource type.

BRIEF DESCRIPTION OF THE DRAWINGS

FIG. 23 illustrates resource types included in the MT-aspect D/U allocation and the DU-aspect D/U allocation that the IAB node gets.

FIG. 26 illustrates a method of using a resource of a node according to an embodiment of the present disclosure.

DESCRIPTION OF EXEMPLARY EMBODIMENTS

Figure 1:
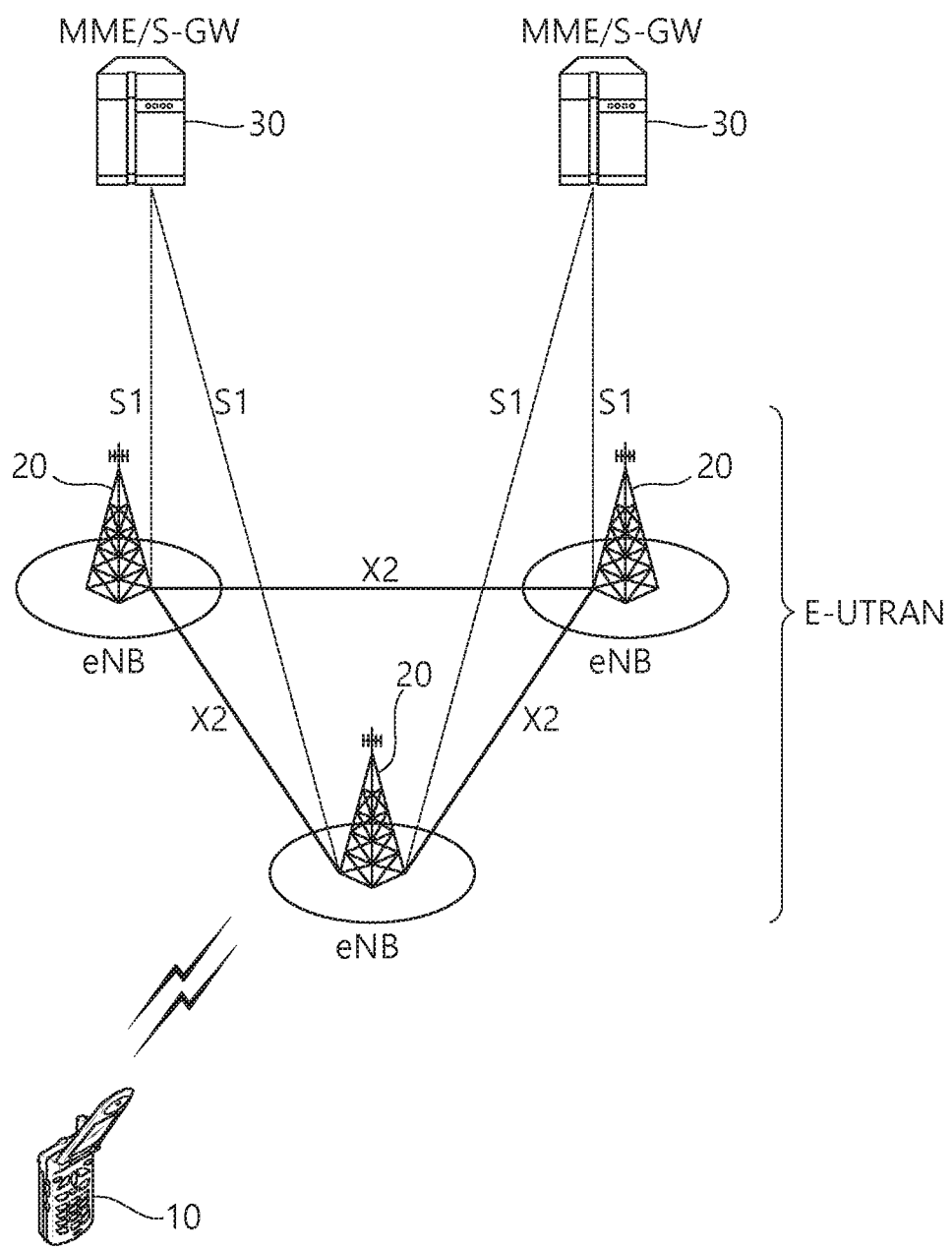
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

An existing wireless communication system may be replaced or coexist with a system using a new radio access technology (new RAT) (or a new radio (NR) system). Hereinafter, an NR system will be described.

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications. In addition, a communication system design considering services or terminals vulnerable to reliability or latency has also been discussed. An introduction of a next-generation RAT considering enhanced mobile broadband communication, massive MTC, ultra-reliable and low latency communication (URLLC), and the like, has been discussed, and in this disclosure, for the purposes of description, the corresponding technology will be termed new RAT or new radio (NR).

Figure 2:
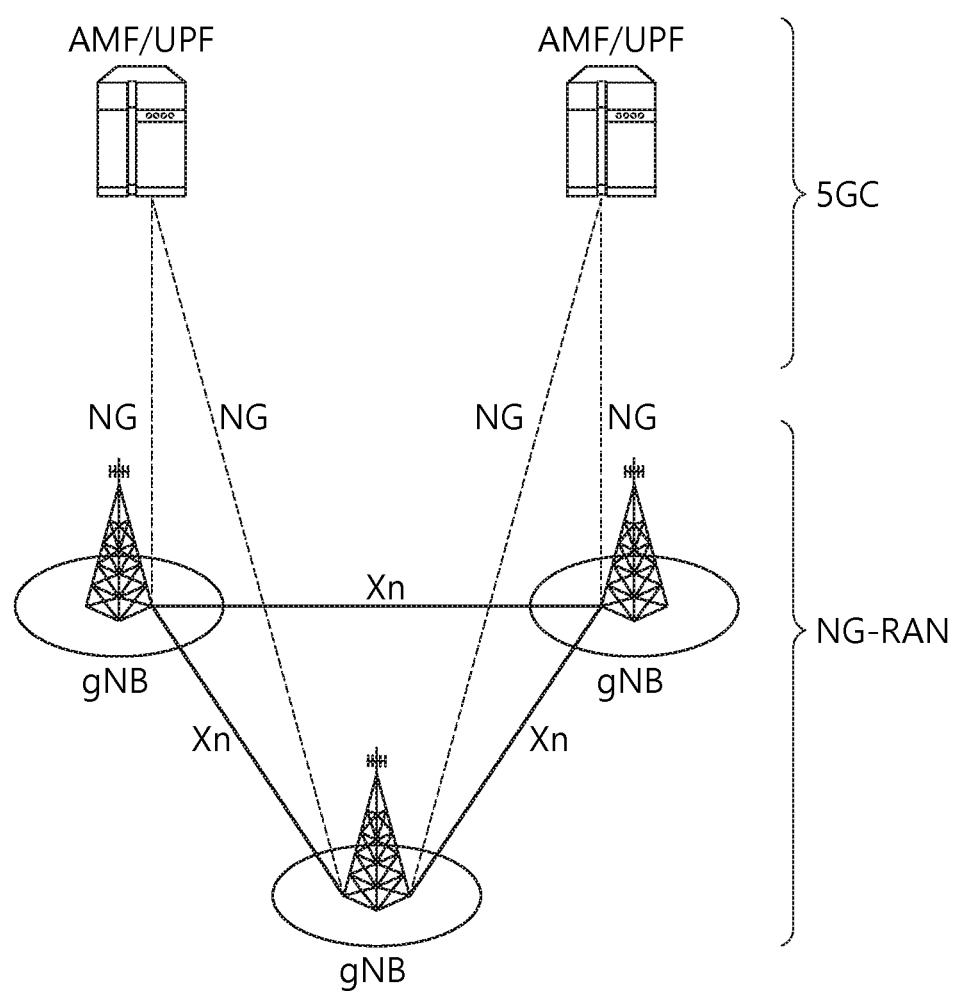
FIG. 2 illustrates a system structure of a next generation radio access network (NG-RAN) to which NR is applied.

FIG. 2 illustrates a system structure of a next generation radio access network (NG-RAN) to which NR is applied.

Figure 4:
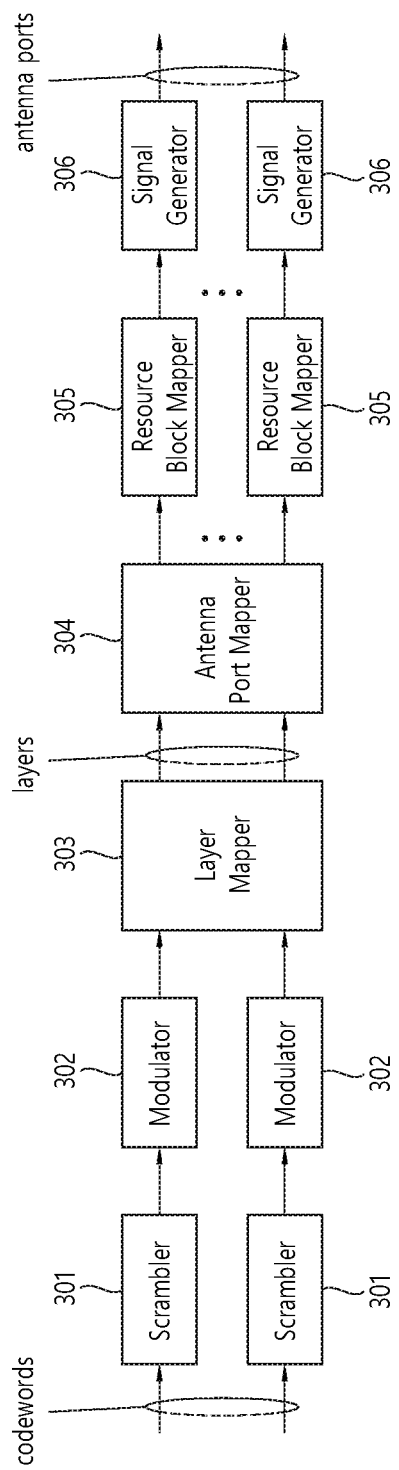
FIG. 4 illustrates an example of a signal processing module structure in the transmitting device 10.

Referring to FIG. 2, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like.

Figure 3:
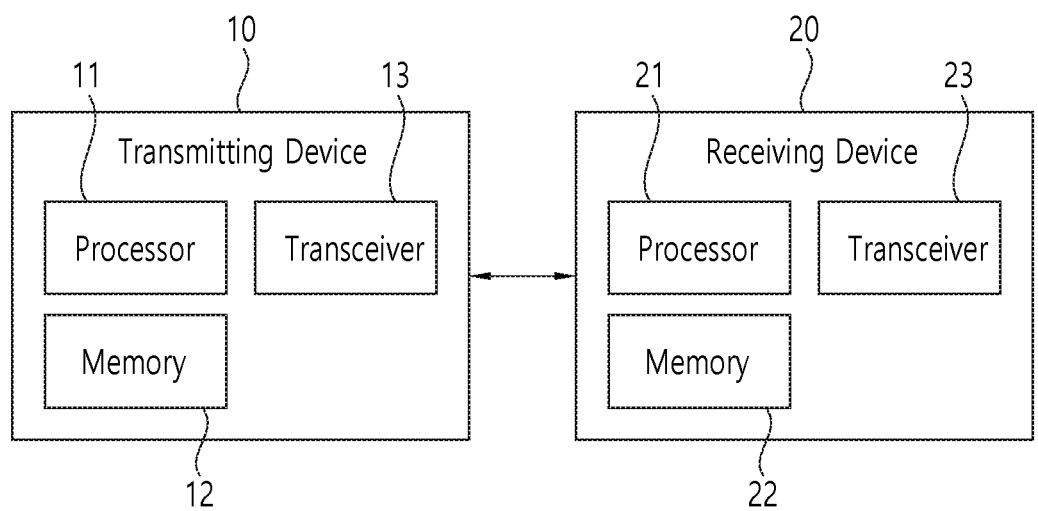
FIG. 3 is a block diagram showing components of a transmitting device 10 and a receiving device 20 for implementing the present disclosure.

FIG. 3 is a block diagram showing components of a transmitting device 10 and a receiving device 20 for implementing the present disclosure. Here, the transmitting device and the receiving device may be a base station and a terminal.

The transmitting device 10 and the receiving device 20 may respectively include transceivers 13 and 23 capable of transmitting or receiving radio frequency (RF) signals carrying information, data, signals and messages, memories 12 and 22 for storing various types of information regarding communication in a wireless communication system, and processors 11 and 21 connected to components such as the transceivers 13 and 23 and the memories 12 and 22 and configured to control the memories 12 and 22 and/or the transceivers 13 and 23 such that the corresponding devices perform at least one of embodiments of the present disclosure.

The memories 12 and 22 can store programs for processing and control of the processors 11 and 21 and temporarily store input/output information. The memories 12 and 22 may be used as buffers.

The processors 11 and 21 generally control overall operations of various modules in the transmitting device and the receiving device. Particularly, the processors 11 and 21 can execute various control functions for implementing the present disclosure. The processors 11 and 21 may be referred to as controllers, microcontrollers, microprocessors, microcomputers, etc. The processors 11 and 21 can be realized by hardware, firmware, software or a combination thereof. When the present disclosure is realized using hardware, the processors 11 and 21 may include ASICs (application specific integrated circuits), DSPs (digital signal processors), DSPDs (digital signal processing devices), PLDs (programmable logic devices), FPGAs (field programmable gate arrays) or the like configured to implement the present disclosure. When the present disclosure is realized using firmware or software, the firmware or software may be configured to include modules, procedures or functions for performing functions or operations of the present disclosure, and the firmware or software configured to implement the present disclosure may be included in the processors 11 and 21 or stored in the memories 12 and 22 and executed by the processors 11 and 21.

The processor 11 of the transmitting device 10 can perform predetermined coding and modulation on a signal and/or data to be transmitted to the outside and then transmit the signal and/or data to the transceiver 13. For example, the processor 11 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 13 may include an oscillator for frequency up-conversion. The transceiver 13 may include one or multiple transmission antennas.

The signal processing procedure of the receiving device 20 may be reverse to the signal processing procedure of the transmitting device 10. The transceiver 23 of the receiving device 20 can receive RF signals transmitted from the transmitting device 10 under the control of the processor 21. The transceiver 23 may include one or multiple reception antennas. The transceiver 23 can frequency-down-convert signals received through the reception antennas to restore baseband signals. The transceiver 23 may include an oscillator for frequency down conversion. The processor 21 can perform decoding and demodulation on RF signals received through the reception antennas to restore data that is intended to be transmitted by the transmitting device 10.

The transceivers 13 and 23 may include one or multiple antennas. The antennas can transmit signals processed by the transceivers 13 and 23 to the outside or receive RF signals from the outside and deliver the RF signal to the transceivers 13 and 23 under the control of the processors 11 and 21 according to an embodiment of the present disclosure. The antennas may be referred to as antenna ports. Each antenna may correspond to one physical antenna or may be configured by a combination of a plurality of physical antenna elements. A signal transmitted from each antenna cannot be decomposed by the receiving device 20. A reference signal (RS) transmitted corresponding to an antenna defines an antenna from the viewpoint of the receiving device 20 and can allow the receiving device 20 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

FIG. 4 illustrates an example of a signal processing module structure in the transmitting device 10. Here, signal processing can be performed by a processor of a base station/terminal, such as the processor 11 of FIG. 3.

Referring to FIG. 4, the transmitting device 10 included in a terminal or a base station may include scramblers 301, modulators 302, a layer mapper 303, an antenna port mapper 304, resource block mappers 305 and signal generators 306.

The transmitting device 10 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 5:
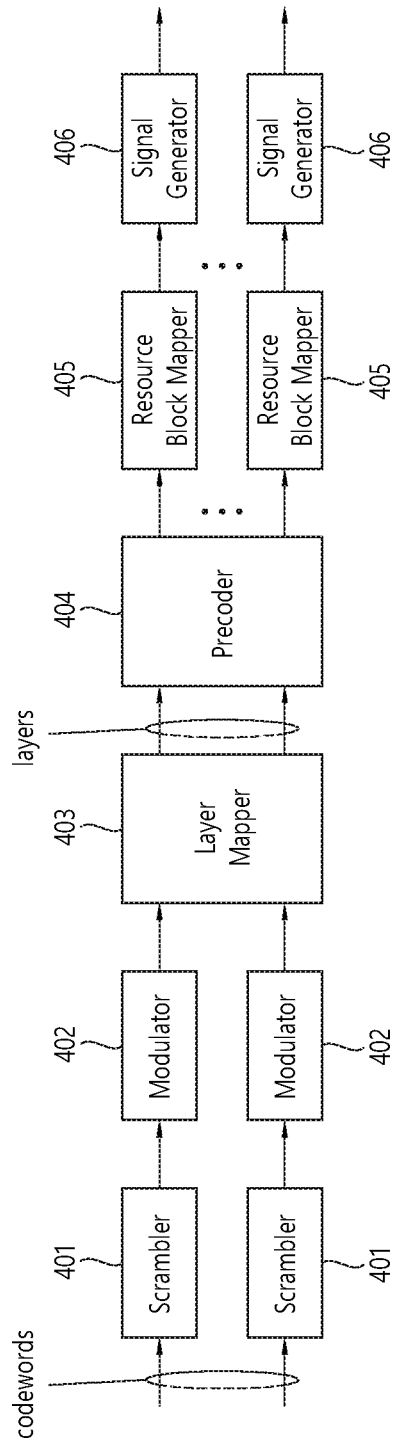
FIG. 5 illustrates another example of the signal processing module structure in the transmitting device 10.

FIG. 5 illustrates another example of the signal processing module structure in the transmitting device 10. Here, signal processing can be performed by a processor of a terminal/base station, such as the processor 11 of FIG. 3.

Referring to FIG. 5, the transmitting device 10 included in a terminal or a base station may include scramblers 401, modulators 402, a layer mapper 403, a precoder 404, resource block mappers 405 and signal generators 406.

The transmitting device 10 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device 20 may be reverse to the signal processing procedure of the transmitting device. Specifically, the processor 21 of the transmitting device 10 decodes and demodulates RF signals received through antenna ports of the transceiver 23. The receiving device 20 may include a plurality of reception antennas, and signals received through the reception antennas are restored to baseband signals, and then multiplexed and demodulated according to MIMO to be restored to a data string intended to be transmitted by the transmitting device 10. The receiving device 20 may include a signal restoration unit which restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal which removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 6:
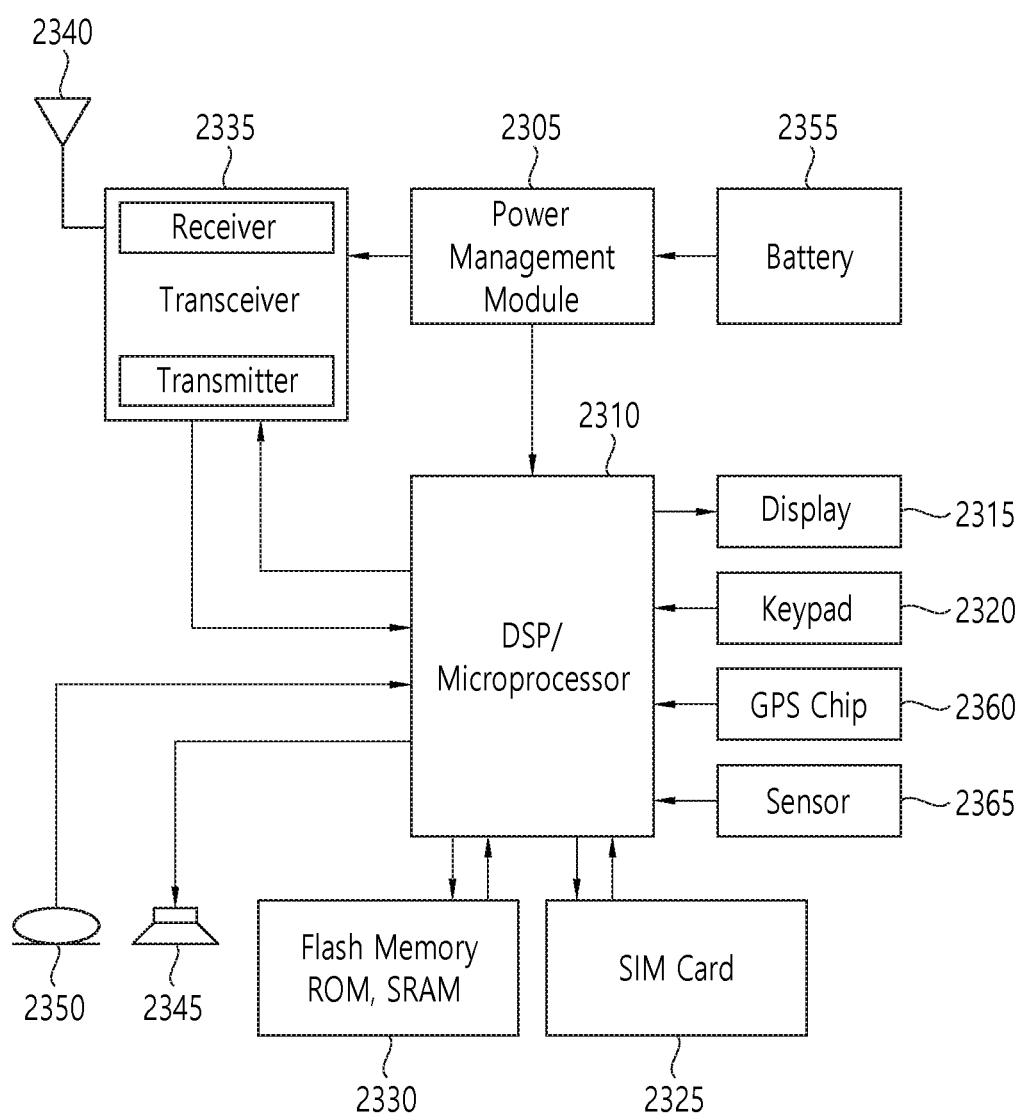
FIG. 6 illustrates an example of a wireless communication device according to an implementation example of the present disclosure.

FIG. 6 illustrates an example of a wireless communication device according to an implementation example of the present disclosure.

Referring to FIG. 6, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 6 may be the processors 11 and 21 in FIG. 3.

The memory 2330 is connected to the processor 231 and stores information related to operations of the processor. The memory may be located inside or outside the processor and connected to the processor through various techniques such as wired connection and wireless connection. The memory 2330 in FIG. 6 may be the memories 12 and 22 in FIG. 3.

A user can input various types of information such as telephone numbers using various techniques such as pressing buttons of the keypad 2320 or activating sound using the microphone 250. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 6 may be the transceivers 13 and 23 in FIG. 3.

Although not shown n FIG. 6, various components such as a camera and a universal serial bus (USB) port may be additionally included in the terminal. For example, the camera may be connected to the processor 2310.

FIG. 6 is just an example of implementation with respect to the terminal and implementation examples of the present disclosure are not limited thereto. The terminal need not essentially include all the components shown in FIG. 6. That is, some of the components, for example, the keypad 2320, the GPS chip 2360, the sensor 2365 and the SIM card 2325 may not be essential components. In this case, they may not be included in the terminal.

Figure 7:
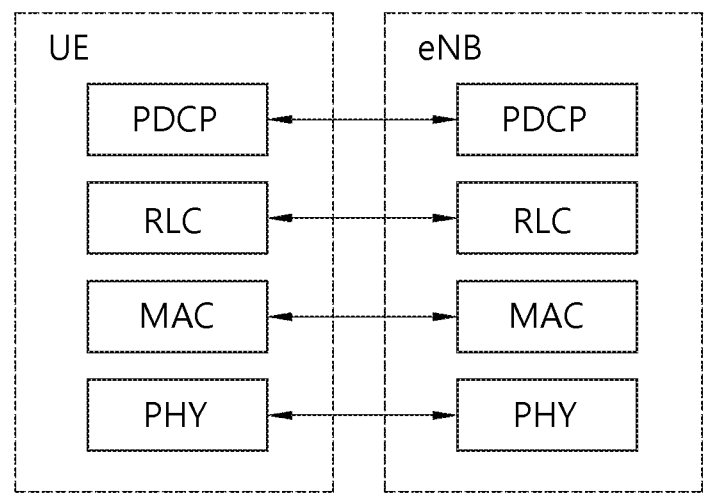
FIG. 7 is a diagram showing a radio protocol architecture for a user plane.
Figure 8:
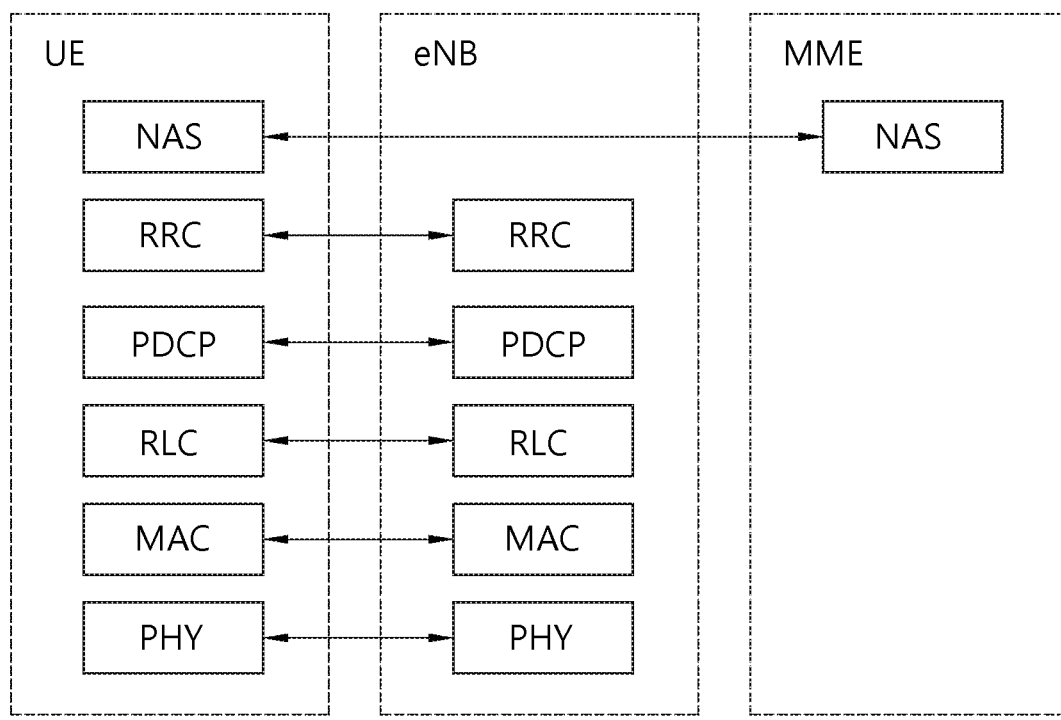
FIG. 8 is a diagram showing a radio protocol architecture for a control plane.

FIG. 7 is a block diagram illustrating radio protocol architecture for a user plane. FIG. 8 is a block diagram illustrating radio protocol architecture for a control plane. The user plane is a protocol stack for user data transmission. The control plane is a protocol stack for control signal transmission.

Referring to FIGS. 7 and 8, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and a frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state; otherwise, the UE is in an RRC idle state.

Data is transmitted from the network to the UE through a downlink transport channel. Examples of the downlink transport channel include a broadcast channel (BCH) for transmitting system information and a downlink shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), and the like.

The physical channel includes a plurality of OFDM symbols in the time domain and a plurality of subcarriers in the frequency domain. One subframe includes a plurality of OFDM symbols in the time domain. A resource block is a resource allocation unit and includes a plurality of OFDM symbols and a plurality of subcarriers. Further, each subframe may use specific subcarriers of specific OFDM symbols (e.g., a first OFDM symbol) of the subframe for a physical downlink control channel (PDCCH), that is, an L1/L2 control channel. A transmission time interval (TTI) is a unit time for subframe transmission.

Figure 9:
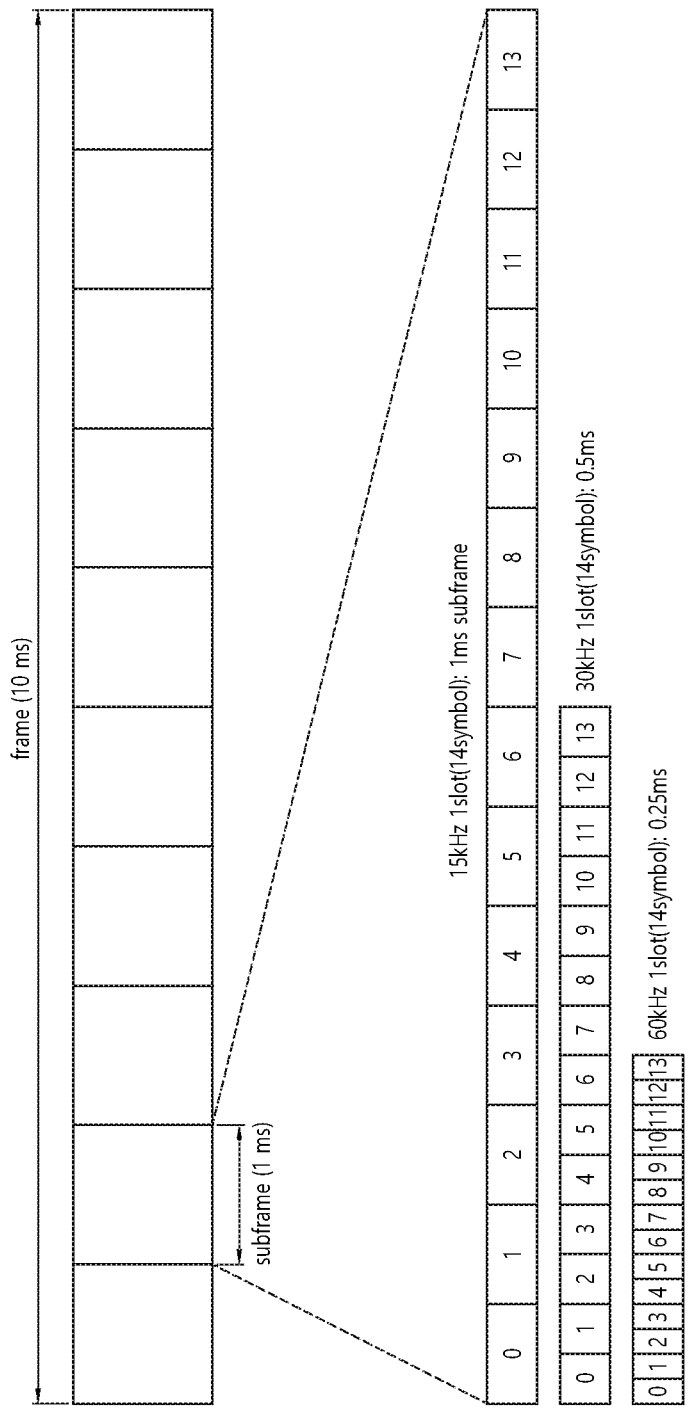
FIG. 9 illustrates a frame structure that may be applied in NR.

FIG. 9 illustrates a frame structure applicable in NR.

Referring to FIG. 9, a frame may be 10 milliseconds (ms) and may include ten 1-ms subframes. Various fields in the time domain may be represented by a time unit $T_c = 1/(\Delta f_{max} \cdot N_f)$, where $\Delta f_{max} = 480 \cdot 10^3$ Hz and $N_f = 4096$.

In a carrier, there may be one set of frames for an uplink and one set of frames for a downlink. Transmission of an uplink frame i may be started $T_{TA} = (N_{TA} + N_{TA,offset})T_c$ earlier than the start of a corresponding downlink frame i.

One slot or a plurality of slots may be included in a subframe according to subcarrier spacing.

The following table illustrates a subcarrier spacing configuration μ.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 2-1 illustrates the number of slots in a frame ($N^{frame,\mu}_{slot}$), the number of slots in a subframe ($N^{subframe,\mu}_{slot}$), and the number of symbols in a slot ($N^{slot}_{symb}$) according to a subcarrier spacing configuration μ in a normal CP. Table 2-2 illustrates the number of slots in a frame ($N^{frame,\mu}_{slot}$), illustrates the number of slots in a subframe ($N^{subframe,\mu}_{slot}$), and the number of symbols in a slot ($N^{slot}_{symb}$) according to a subcarrier spacing configuration p in an extended CP.

TABLE 2-1

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2-2

| μ | $N^{slot}_{symb}$ | $N^{frame,\mu}_{slot}$ | $N^{subframe,\mu}_{slot}$ |
|---|---|---|---|
| 2 | 12 | 40 | 4 |

FIG. 9 illustrates examples where μ=0, 1, 2.

A plurality of orthogonal frequency division multiplexing (OFDM) symbols may be included in a slot. The plurality of OFDM symbols in the slot may be divided into downlink symbols (represented by D), flexible symbols (represented by X), and uplink symbols (represented by U). The format of the slot may be determined according to which of D, X, and U the OFDM symbols in the slot include.

The following table illustrates an example of a slot format.

TABLE 3

| for-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |

TABLE 3-continued

| for-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | X | X | X | X | X | X | X | U | U |
| 45 | D | D | D | D | D | D | X | X | U | U | U | U | U | U |
| 46 | D | D | D | D | X | D | D | D | D | D | D | X | D | U |
| 47 | D | D | X | U | U | U | D | D | X | U | U | U | U | U |
| 48 | D | X | U | U | U | U | D | X | U | U | U | U | U | U |
| 49 | D | D | D | X | X | U | D | D | D | D | X | X | U | U |
| 50 | D | D | X | X | U | U | D | D | X | X | U | U | U | U |
| 51 | D | X | X | U | U | U | D | X | X | U | U | U | U | U |
| 52 | D | X | X | X | X | U | D | X | X | X | X | U | U | U |
| 53 | D | D | X | X | X | U | D | D | X | X | X | X | U | U |
| 54 | X | X | X | X | X | X | D | D | D | D | D | D | D | D |
| 55 | D | D | X | X | X | U | U | U | D | D | D | D | D | D |
| 56-255 | Reserved | | | | | | | | | | | | | |

A UE may be allocated a slot format through an upper-layer signal, through DCI, or on the basis of a combination of an upper-layer signal and DCI.

An antenna port is defined such that a channel carrying a symbol on the antenna port can be inferred from a channel carrying another symbol on the same antenna port. If large-scale properties of a channel carrying a symbol on one antenna port can be inferred from a channel carrying a symbol on another antenna port, the two antenna ports are regarded as being quasi co-located. The large-scale properties may include at least one of delay spread, Doppler spread, Doppler shift, average gain, average delay, and spatial Rx parameters.

A resource grid may be defined to include a certain number of subcarriers and OFDM symbols for each numerology and carrier and may start from a common resource block indicated by upper-layer signaling.

A resource element (RE) is each element of a resource grid for an antenna port and a subcarrier spacing configuration and may correspond to a complex value.

A resource block (RB) may be defined as contiguous subcarriers (e.g., 12 subcarriers) in the frequency domain. A reference resource block may be numbered in ascending order from zero in the frequency domain. Subcarrier 0 of reference resource block 0 is also denoted by reference point A and is common to all subcarrier spacing configurations. The reference resource block may also be used as a common reference point for other resource block grids, and reference point A may be obtained from an upper-layer parameter.

A common resource block may be numbered in ascending order from zero in the frequency domain for a subcarrier spacing configuration. Subcarrier 0 of common resource block 0 for a subcarrier spacing configuration may correspond to reference point A.

A physical resource block and a virtual resource block may be defined within a carrier bandwidth part and may be numbered in ascending order from zero.

According to carrier aggregation, up to 15 secondary cells may be aggregated and used in addition to a primary cell. That is, up to 16 serving cells may be aggregated for a UE.

A physical downlink control channel (PDCCH) may include one or more control channel elements (CCEs) as illustrated in the following table.

TABLE 4

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource composed of 1, 2, 4, 8, or 16 CCEs. Here, the CCE is composed of six resource element groups (REGs), and one REG is composed of one resource block in the frequency domain and one orthogonal frequency division multiplexing (OFDM) symbol in the time domain.

Meanwhile, in a future wireless communication system, a new unit called control resource set (CORESET) may be introduced. The terminal may receive the PDCCH in the CORESET.

Figure 10:
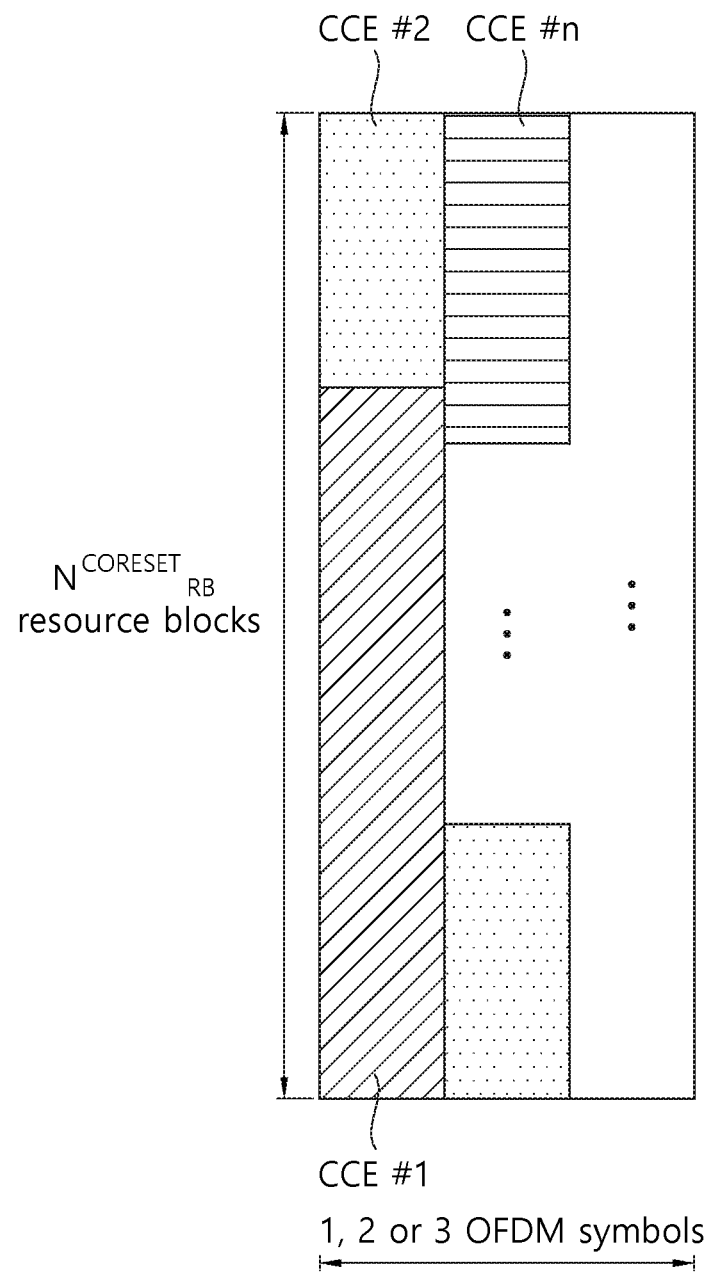
FIG. 10 illustrates CORESET.

FIG. 10 illustrates a CORESET.

Referring to FIG. 10, a CORESET may include $N^{CORESET}_{RB}$ resource blocks in the frequency domain and may include $N^{CORESET}_{symb} \in \{1, 2, 3\}$ symbols in the time domain. $N^{CORESET}_{RB}$ and $N^{CORESET}_{symb}$ may be provided by a base station through a higher-layer signal. As illustrated in FIG. 10, the CORESET may include a plurality of CCEs (or REGs).

A UE may attempt PDCCH detection in a unit of 1, 2, 4, 8, or 16 CCEs within the CORESET. One or a plurality of CCEs for attempting PDCCH detection may be referred to as a PDCCH candidate.

The UE may be allocated a plurality of CORESETs.

Figure 11:
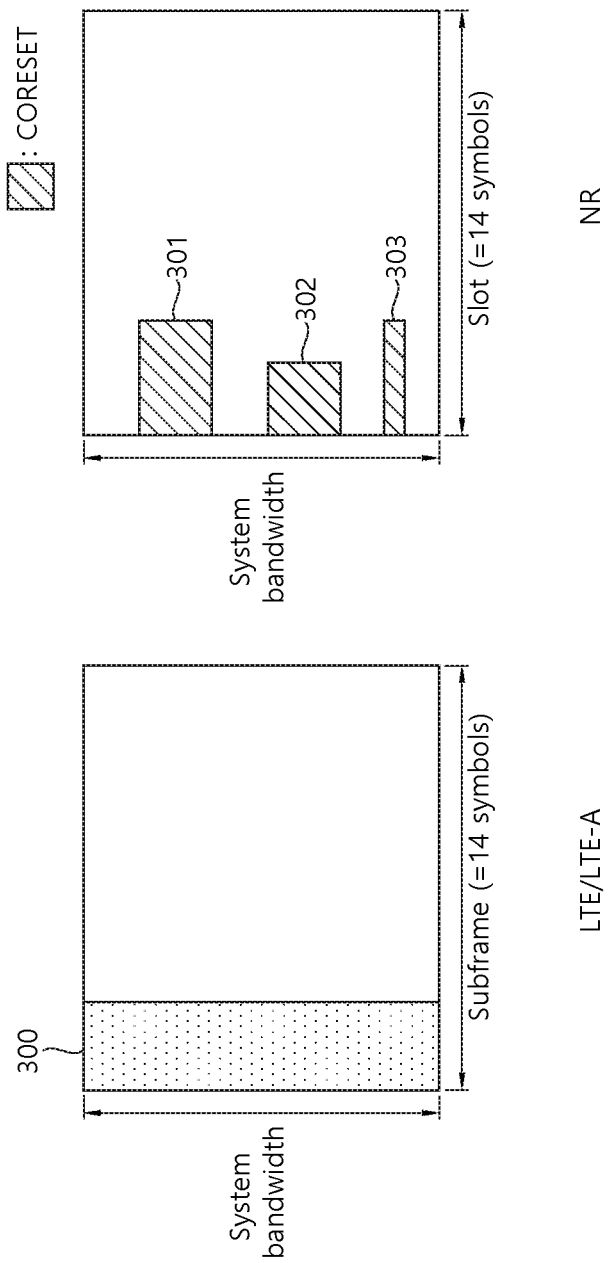
FIG. 11 is a diagram illustrating a difference between a related art control region and the CORESET in NR.

FIG. 11 illustrates a difference between a conventional control region and a CORESET in NR.

Referring to FIG. 11, a control region 300 in a conventional wireless communication system (e.g., LTE/LTE-A) is configured over the entire system bandwidth used by a base station. Excluding some UEs (e.g., eMTC/NB-IoTUEs) supporting only a narrow bandwidth, all UEs need to be able to receive a radio signal in the entire system bandwidth of the base station in order to properly receive/decode control information transmitted by the base station.

In a future wireless communication system, a CORESET illustrated above is introduced. CORESETs 301, 302, and 303 may be radio resources for control information that a UE needs to receive and may occupy only part of a system bandwidth instead of the entire system bandwidth. A base station may allocate a CORESET to each UE and may transmit control information through the allocated CORESET. For example, in FIG. 11, the base station may allocate a first CORESET 301 to a first UE, may allocate a second CORESET 302 to a second UE, and may allocate a third CORESET 303 to a third UE. A UE in NR may receive control information from a base station even though not necessarily receiving the entire system bandwidth.

CORESETs may be divided into a UE-specific CORESET for transmitting UE-specific control information and a common CORESET for transmitting control information common to all UEs.

Figure 12:
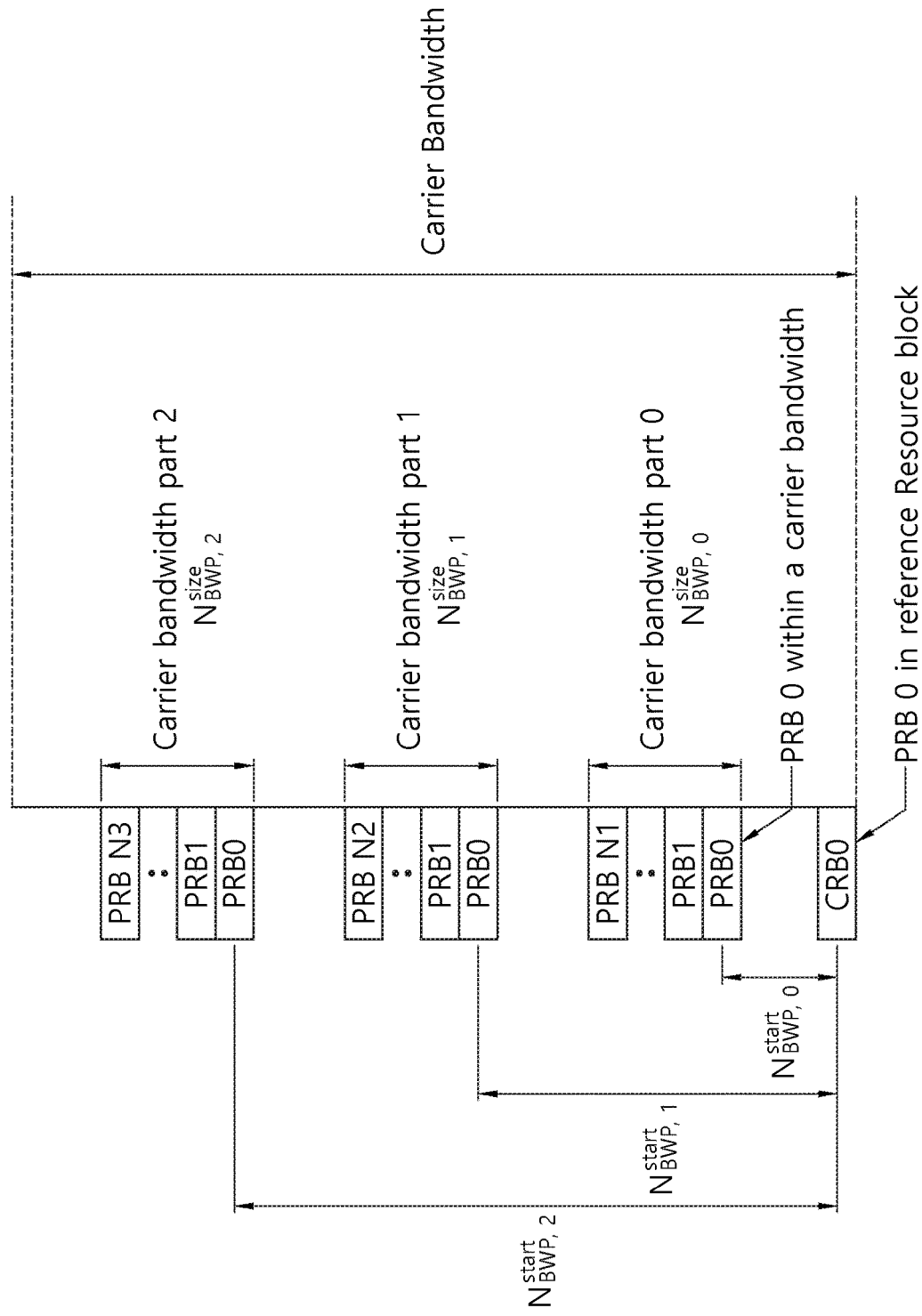
FIG. 12 illustrates carrier bandwidth part newly introduced to NR.

FIG. 12 illustrates a carrier bandwidth part newly introduced in NR.

Referring to FIG. 12, a carrier bandwidth part may be simply referred to as a bandwidth part (BWP). As described above, in the future wireless communication system, various numerologies (e.g., various subcarrier spacings) may be supported for the same carrier. NR may define a common resource block (CRB) for a given numerology on a given carrier.

A bandwidth part is a set of contiguous physical resource blocks (PRBs) selected from contiguous subsets of common resource blocks (CRBs) for a given numerology on a given carrier.

As illustrated in FIG. 12, a common resource block may be determined according to numerology for a carrier bandwidth, for example, subcarrier spacing to be used. The common resource block may be indexed from the lowest frequency of the carrier bandwidth (start from zero), and a resource grid based on the common resource block (referred to as a common resource block resource grid) may be defined.

A bandwidth part may be indicated on the basis of a CRB having the lowest index (referred to as CRB 0). CRB 0 having the lowest index is also referred to as point A.

For example, according to given numerology of an allocated carrier, bandwidth part i may be indicated by $N^{start}_{BWP,i}$ and $N^{size}_{BWP,i}$. $N^{start}_{BWP,i}$ may indicate a starting CRB of bandwidth part i on the basis of CRB 0, and $N^{size}_{BWP,i}$ may indicate the size of bandwidth part i (e.g., in PRBs) in the frequency domain. PRBs in each bandwidth part may be indexed from 0. The index of a CRB in each bandwidth part may be mapped to the index of a PRB. For example, $n_{CRB}=n_{PRB}+N^{start}_{BWP,i}$.

The UE may be allocated up to four downlink bandwidth parts in a downlink, but only one downlink bandwidth part may be activated at a given time. The UE does not expect to receive a PDSCH, a PDCCH, a CSI-RS, or the like via a downlink bandwidth part other than the activated downlink bandwidth part among the downlink bandwidth parts. Each downlink bandwidth part may include at least one CORESET.

The UE may be allocated up to four uplink bandwidth parts in an uplink, but only one uplink bandwidth part may be activated at a given time. The UE does not transmit a PUSCH, a PUCCH, or the like via an uplink bandwidth part other than the activated uplink bandwidth part among the uplink bandwidth parts.

NR operates in a wider band than in a conventional system, where not all UEs can support a wideband. A bandwidth part (BWP) enables a UE incapable of supporting a wideband to operate.

A UE configured to operate in a bandwidth part (BWP) of a serving cell may be allocated a set of up to four bandwidth parts (BWP) by an upper layer for the serving cell.

An initial activation downlink bandwidth part (DL BWP) may be defined by the positions and number of adjacent PRBs, subcarrier spacing, and a CP for a control resource set for a type 0-PDCCH common search space. For an operation in a primary cell, a UE may be provided with upper-layer parameters for a random access procedure.

In an unpaired spectrum operation, a UE may expect that the center frequency for a DL BWP is the same as the center frequency for a UL BWP.

Hereinafter, a resource allocation type will be described. A resource allocation type specifies a method for a scheduler (e.g., a base station) to allocate resource blocks for each transmission. For example, when a base station allocates a bandwidth including a plurality of resource blocks to a UE, the base station may report the resource blocks allocated to the UE through a bitmap including bits corresponding to the respective resource blocks of the band. In this case, the flexibility of resource allocation is increased, while the amount of information used for resource allocation is also increased.

In view of this advantage and disadvantage, the following three resource allocation types may be defined/used.

1) Resource allocation type 0 is a method of allocating a resource through a bitmap, each bit of which indicates a resource block group (RBG) rather than a resource block. That is, in resource allocation type 0, resource allocation is performed in resource block groups, not in resource blocks. The following table illustrates the size of a RBG used when a system bandwidth includes $N^{DL}_{RB}$ resource blocks.

TABLE 5

| System bandwidth ($N_{RB}^{DL}$) | RBG size (P) |
| --- | --- |
| ≤10 | 1 |
| 11-24 | 2 |
| 25-63 | 6 |
| 64-110 | 12 |

2) Resource allocation type 1 is a method of allocating a resource in RBG subsets. One RBG subset may include a plurality of RBGs. For example, RBG subset #0 may include RBGs #0, #3, #6, #9, and the like; RBG subset #1 may include RBGs #1, #4, #7, #10, and the like; RBG subset #2 may include RBGs #2, #5, #8, #11, and the like. The number of RBGs included in one RBG subset and the number of resource blocks (RBs) included in one RBG are set to be the same. Resource allocation type 1 indicates which RBG subset is used among RBG subsets and which RB in the RBG is used.

3) Resource allocation type 2 is a method of allocating a resource by indicating the starting position (RB number) of an allocated bandwidth and the number of contiguous resource blocks. The contiguous resource blocks may start from the starting position. Here, the contiguous resource blocks are not necessarily limited to physical contiguity but may mean that logical or virtual resource block indexes are contiguous.

In future wireless communication systems, the number of resource blocks included in an RBG (or a group of RBs) may be c flexibly hanged. In this case, information about the RBG, for example, information indicating the number of resource blocks included in the RBG, may be transmitted through an upper-layer signal, such as scheduling DCI, third physical layer (L1) signaling, or an RRC message.

Further, in future wireless communication systems, resource allocation information (e.g., the information about the RBG) may include time-domain information in addition to frequency-domain information. The type of included information and a method for including information may also be flexibly changed.

Hereinafter, a physical channel and a signal transmission process will be described.

Figure 13:
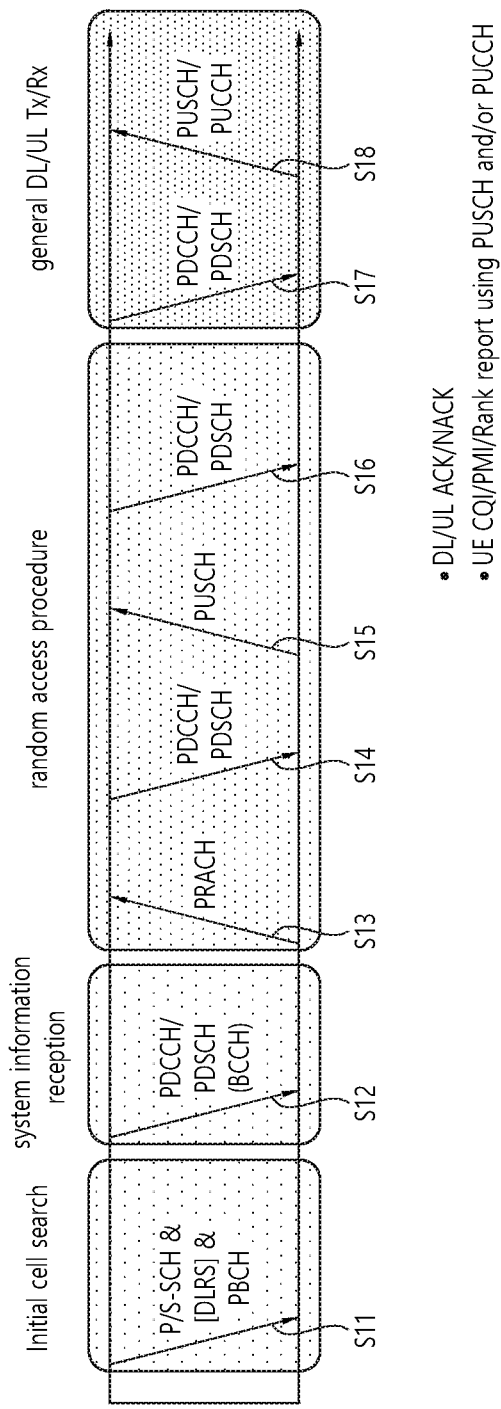
FIG. 13 illustrates physical channels and a normal signal transmission process in the 3GPP system.

FIG. 13 illustrates physical channels and general signal transmission used in a 3GPP system.

In a wireless communication system, a UE receives information from a base station through a downlink (DL) and transmits information to the base station through an uplink (UL). Information transmitted and received between the base station and the UE includes data and various pieces of control information, and various physical channels exist according to the type/use of the transmitted and received information.

When turned-off power is turned on again or the UE enters a new cell, the UE performs an initial cell search operation, such as synchronization with the base station (S11). To this end, the UE receives a primary synchronization channel (PSCH) and a secondary synchronization channel (SSCH) from the base station, synchronizes with the base station and obtains information, such as a cell identity. Further, the UE may receive a physical broadcast channel (PBCH) from the base station to obtain in-cell broadcast information. In addition, the UE may receive a downlink reference signal (DL RS) to check a downlink channel state in the cell initial cell search operation.

When the initial cell search is completed, the UE may receive a physical downlink control channel (PDCCH) and a physical downlink shared channel (PDSCH) corresponding to the PDCCH, thus obtaining more specific system information (S12).

Subsequently, the UE may perform a random access procedure to complete access to the base station (S13 to S16). In detail, the UE may transmit a preamble through a physical random access channel (PRACH) (S13), and may receive a random access response (RAR) in response to the preamble through a PDCCH and a PDSCH corresponding to the PDCCH (S14). Then, the UE may transmit a physical uplink shared channel (PUSCH) using scheduling information in the RAR (S15) and may perform a contention resolution procedure through a PDCCH and a PDSCH corresponding to the PDCCH (S16).

After performing this procedure, the UE may perform a general uplink/downlink signal transmission procedure of receiving a PDCCH/PDSCH (S17) and transmitting a PUSCH/physical uplink control channel (PUCCH) (S18). Control information transmitted from the UE to the base station is referred to as uplink control information (UCI). UCI includes a hybrid automatic repeat and request acknowledgement/negative-ACK (HARQ ACK/NACK), a scheduling request (SR), channel state information (CSI), and the like. The CSI includes a channel quality indicator (CQI), a precoding matrix indicator (PMI), a rank indication (RI), and the like. UCI is generally transmitted through a PUCCH, but may be transmitted through a PUSCH when control information and data need to be transmitted at the same time. Further, the UE may aperiodically transmit UCI through a PUSCH according to a request/indication from a network.

Hereinafter, a cell search will be described.

A cell search is a procedure in which a UE achieves time and frequency synchronization for a cell and detects a physical-layer cell ID of the cell. To perform a cell search, the UE receives a primary synchronization signal (PSS) and a secondary synchronization signal (SSS).

The UE may assume that the reception occasions of a PBCH, a PSS, and an SSS span contiguous symbols and form an SS/PBCH block. The UE may assume that an SSS, a PBCH DM-RS, and PBCH data have the same EPRE. The UE may assume that the ratio between SSS EPRE and PSS EPRE in an SS/PBCH block of the cell is 0 dB or 3 dB.

The cell search procedure of the UE may be summarized as illustrated in Table A.

TABLE A

| | Type of signal | Operation |
|---|---|---|
| Operation 1 | PSS | * To obtain SS/PBCH block (SSB) symbol timing<br>* To retrieve cell ID in cell ID group (3 hypotheses) |
| Operation 2 | SSS | * To detect cell ID group (336 hypotheses) |
| Operation 3 | PBCH DMRS | * SSB index and half frame index (slog and frame boundary detection) |
| Operation 4 | PBCH | * Time information (80 ms, SFN, SSB index, HF)<br>* To configure RMSI CORESET/search space |
| Operation 5 | PDCCH and PDSCH | * Cell access information<br>* To configure RACH |

Figure 14:
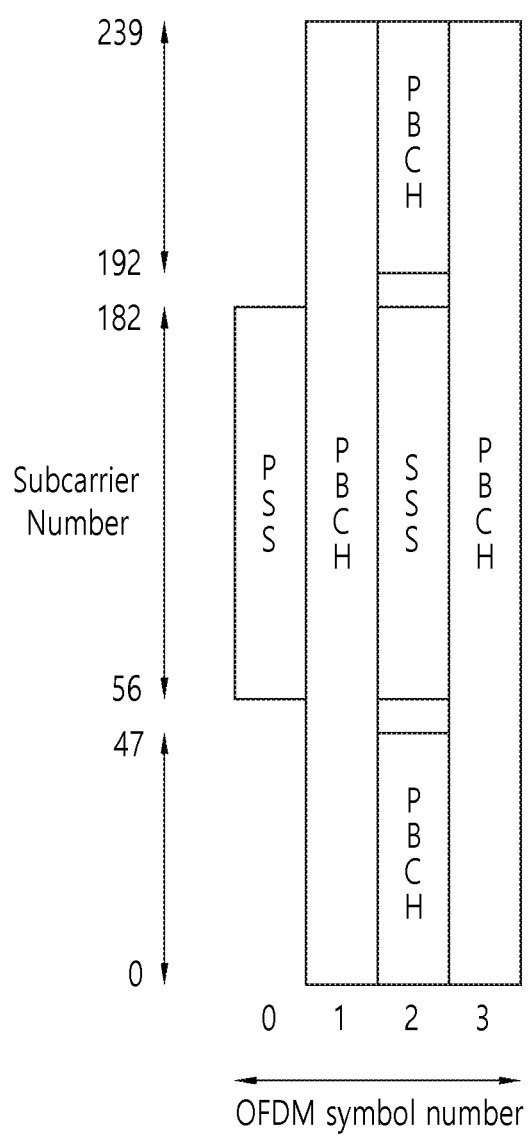
FIG. 14 illustrates a synchronization signal and PBCH (SS/PBCH) block.

FIG. 14 schematically illustrates a synchronization signal/PBCH (SS/PBCH) block.

Referring to FIG. 14, an SS/PBCH block may include a PSS and an SSS, each of which occupies one symbol and 127 subcarriers, and a PBCH, which spans three OFDM symbols and 240 subcarriers where one symbol includes an unoccupied portion in the middle reserved for the SSS. The periodicity of the SS/PBCH block may be configured by a network, and a time position for transmitting the SS/PBCH block is determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols may carry frequency-multiplexed DMRS thereof. QPSK may be used for the PBCH.

1008 unique physical-layer cell IDs may be determined by Equation 1.

$$N_{ID}^{cell} = 3N_{ID}^{(1)} + N_{ID}^{(2)} \text{ (where } N_{ID}^{(1)} \in \{0,1,\ldots,335\} \text{ and } N_{ID}^{(2)} \in \{0,1,2\}) \quad \text{[Equation 1]}$$

A PSS sequence $d_{PSS}(n)$ for the PSS may be defined by Equation 2.

$$d_{PSS}(n) = 1 - 2x(m)$$

$$m = (n + 43N_{ID}^{(2)}) \bmod 127, 0 \leq n < 127,$$

where $x(i+7) = (x(i+4) + x(i)) \bmod 2$ and $$[x(6)\,x(5)\,x(4)\,x(3)\,x(2)\,x(1)\,x(0)] = [1\ 1\ 1\ 0\ 1\ 1\ 0]. \quad \text{[Equation 2]}$$

The sequence may be mapped to a physical resource illustrated in FIG. 14.

An SSS sequence $d_{SSS}(n)$ for the SSS may be defined by Equation 3.

$$d_{SSS}(n) = [1 - 2x_0((n + m_0) \bmod 127)][ \quad \text{[Equation 3]}$$

$$1 - 2x_1((n + m_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \leq n < 127$$

$$x_0(i+7) = (x_0(i+4) + x_0(i)) \bmod 2$$

(Here, $x_1(i+7) = (x_1(i+1) + x_1(i)) \bmod 2$ and $[x_0(6)\ x_0(5)\ x_0(4)\ x_0(3)\ x_0(2)\ x_0(1)\ x_0(0)] = [0\ 0\ 0\ 0\ 0\ 0\ 1]$ $[x_1(6)\ x_1(5)\ x_1(4)\ x_1(3)\ x_1(2)\ x_1(1)\ x_1(0)] = [0\ 0\ 0\ 0\ 0\ 0\ 1].)$ The sequence may be mapped to a physical resource illustrated in FIG. 14.

Regarding a half frame having SS/PBCH blocks, the indexes of first symbols of candidate SS/PBCH blocks may be determined according to the subcarrier spacing of SS/PBCH blocks described blow.

Case A—Subcarrier spacing of 15 kHz: The first symbols of the candidate SS/PBCH blocks have an index represented by $\{2, 8\}+14*n$ where n=0, 1 for a carrier frequency of 3 GHz or less and n=0, 1, 2, 3 for a carrier frequency which is greater than 3 GHz and is less than or equal to 6 GHz.

Case B—Subcarrier spacing of 30 kHz: The first symbols of the candidate SS/PBCH blocks have an index represented by $\{4, 8, 16, 20\}+28*n$ where n=0 for a carrier frequency of 3 GHz or less and n=0, 1 for a carrier frequency which is greater than 3 GHz and is less than or equal to 6 GHz.

Case C—Subcarrier spacing of 30 kHz: The first symbols of the candidate SS/PBCH blocks have an index represented by $\{2, 8\}+14*n$ where n=0, 1 for a carrier frequency of 3 GHz or less and n=0, 1, 2, 3 for a carrier frequency which is greater than 3 GHz and is less than or equal to 6 GHz.

Case D—Subcarrier spacing of 120 kHz: The first symbols of the candidate SS/PBCH blocks have an index represented by $\{4, 8, 16, 20\}+28*n$ where n=0, 1, 2, 3, 5, 6, 7, 8, 10, 11, 12, 13, 15, 16, 17, 18 for a carrier frequency greater than 6 GHz.

Case E—Subcarrier spacing of 240 kHz: The first symbols of the candidate SS/PBCH blocks have an index represented by $\{8, 12, 16, 20, 32, 36, 40, 44\}+56*n$ where n=0, 1, 2, 3, 5, 6, 7, 8 for a carrier frequency greater than 6 GHz.

The candidate SS/PBCH blocks in the half frame may be indexed in ascending order from 0 to L−1 on the time axis. The UE needs to determine two LSBs for L=4 of the SS/PBCH block index per half frame and three LSBs for L>4 from one-to-one mapping with the index of a DM-RS sequence transmitted in the PBCH. For L=64, the UE needs to determine three MSBs of the SS/PBCH block index per half frame by PBCH payload bits $\bar{a}_{\bar{A}+5}, \bar{a}_{\bar{A}+6}, \bar{a}_{\bar{A}+7}$.

The UE may receive a setting of the indexes of SS/PBCH blocks in which the UE cannot receive other signals or channels in REs overlapping with REs corresponding to the SS/PBCH blocks via an upper-layer parameter 'SSB-transmitted-SIB1'. The UE may also receive a setting of the indexes of SS/PBCH blocks per serving cell in which the UE cannot receive other signals or channels in REs overlapping with REs corresponding to the SS/PBCH blocks via an upper-layer parameter 'SSB-transmitted'. The setting via 'SSB-transmitted' may override the setting via 'SSB-transmitted-SIB1'. The UE may receive a setting of the periodicity of a half frame for reception of SS/PBCH blocks per serving cell via an upper-layer parameter 'SSB-periodicity-ServingCell'. When the UE does not receive the setting of the periodicity of the half frame for the reception of the SS/PBCH blocks, the UE may assume the periodicity of the half frame. The UE may assume that the periodicity is the same for all SS/PBCH blocks in a serving cell.

In an NR system, OFDM(A) numerology (e.g., SCS, CP length, or the like) may be set differently for a plurality of cells merged for one UE. Accordingly, the (absolute time) duration of a time resource (e.g., a subframe, a slot, or a TTI, collectively referred to as a time unit (TU) for convenience) including the same number of symbols may be set differently for the merged cells.

Figure 15:
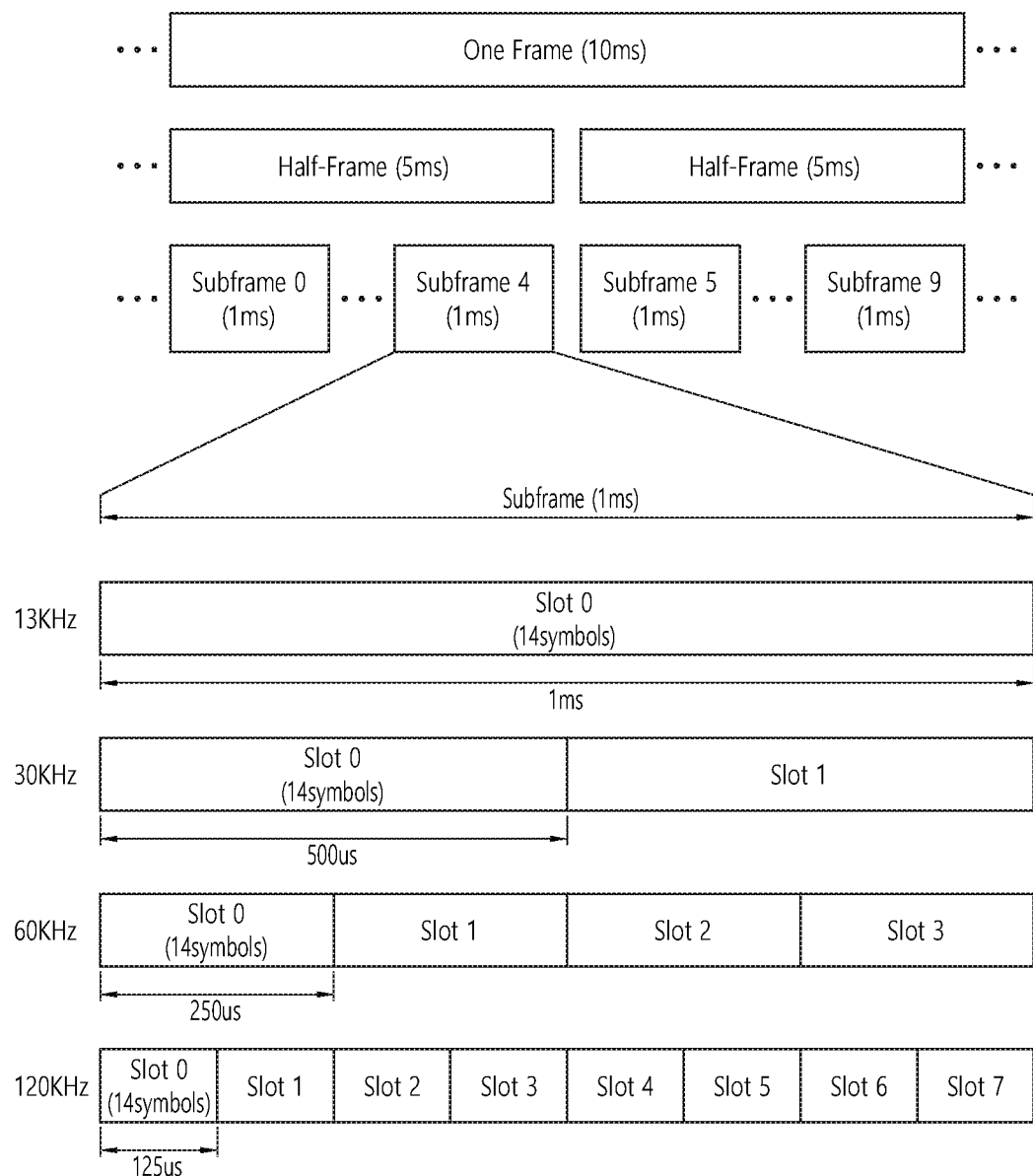
FIG. 15 illustrates a structure of a radio frame that may be used in the next-generation communication.

FIG. 15 illustrates the structure of a radio frame available for next-generation communication.

The radio frame has a length of 10 ms and may be defined as two 5-ms half frames (HFs). A half frame may include five 1-ms subframes (SFs). A subframe may be divided into one or more slots, and the number of slots in a subframe may be determined according to subcarrier spacing (SCS). Each slot may include 12 or 14 OFDM(A) symbols according to a cyclic prefix (CP).

When a normal CP is used, each slot may include 14 symbols. When an extended CP is used, each slot may include 12 symbols. Here, symbols may include an OFDM symbol (or CP-OFDM symbol) and an SC-FDMA symbol (or DFT-s-OFDM symbol).

Figure 16:
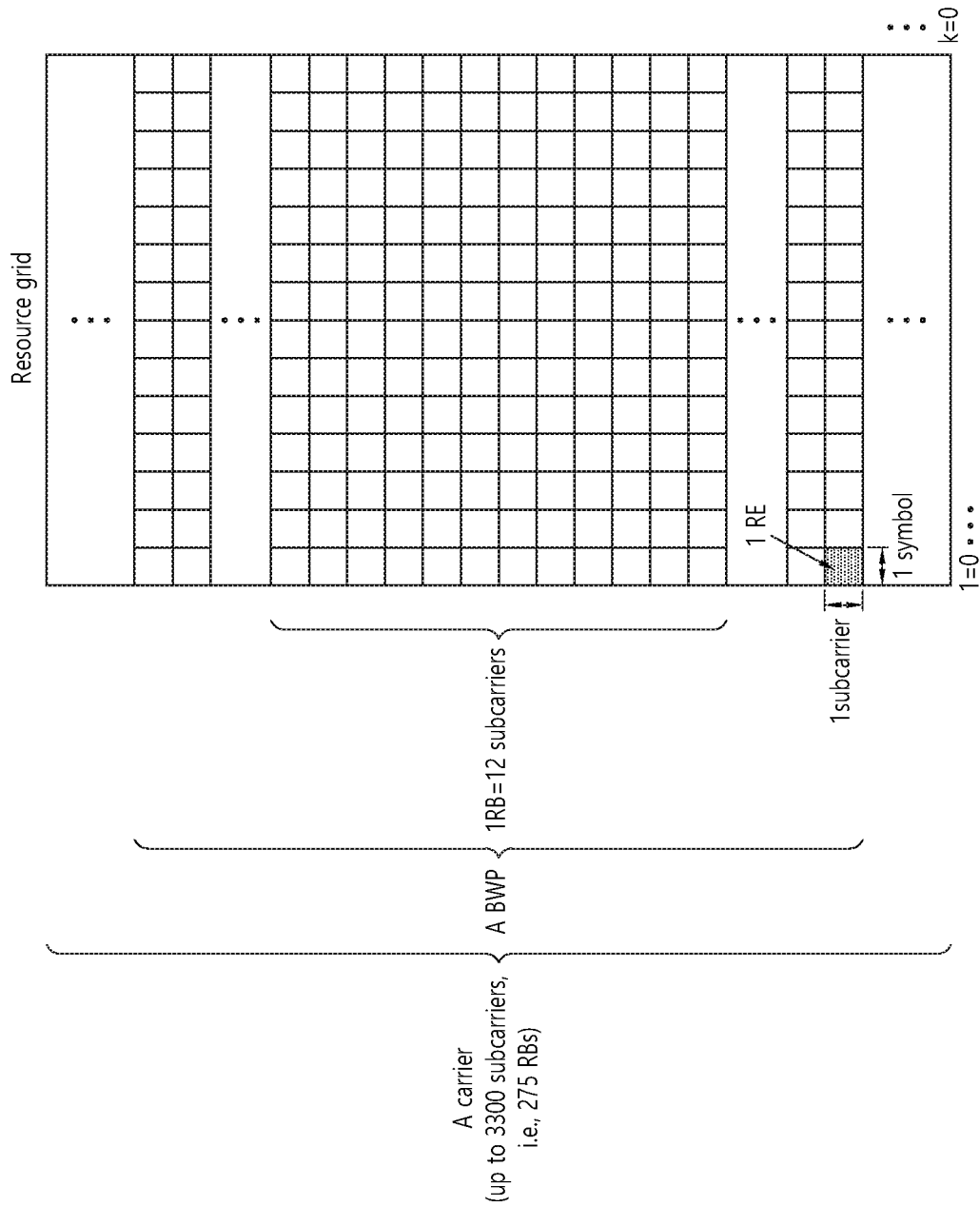
FIG. 16 illustrates a slot structure of a frame used in the next-generation communication.

FIG. 16 illustrates the structure of a slot of a frame used in next-generation communication.

The slot includes a plurality of symbols in the time domain. For example, when a normal CP is used, one slot may include 14 symbols; when an extended CP is used, one slot may include 12 symbols. Alternatively, when a normal CP is used, one slot may include 7 symbols; when an extended CP is used, one slot may include 6 symbols. The number of symbols included in one slot may vary according to a standard specification.

A carrier includes a plurality of subcarriers in the frequency domain. A resource block (RB) may be defined as a plurality of (e.g., 12) contiguous subcarriers in the frequency domain. A bandwidth part (BWP) may be defined as a plurality of contiguous (P)RBs in the frequency domain and may correspond to one numerology (e.g., SCS, CP length, or the like). A carrier may include up to N (e.g., 5) BWPs. Data communication is performed through an activated BWP, and one BWP may be activated for one UE. Each element in a resource grid is referred to as a resource element (RE) and may mapped to one complex symbol.

Figure 17:
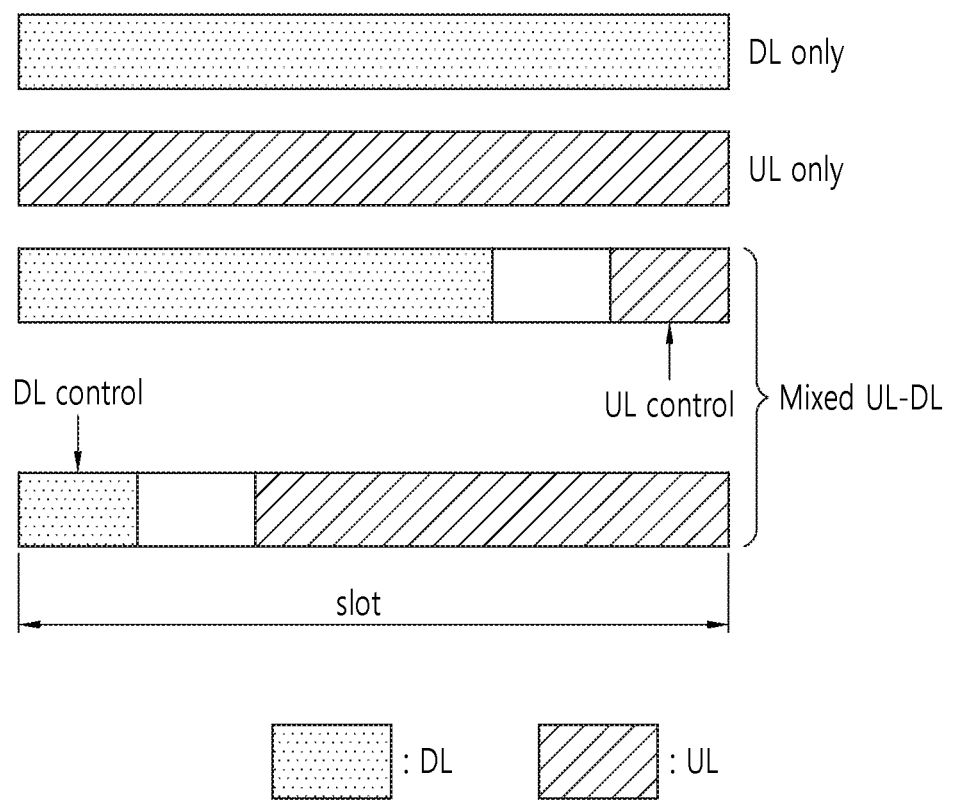
FIG. 17 illustrates a structure of self-contained slot.

FIG. 17 illustrates the structure of a self-contained slot.

A self-contained structure in which all of a DL control channel, a DL or UL data channel, and a UL control channel may be included in one slot may be supported. For example, first N symbols in a slot may be used to transmit a DL control channel (hereinafter, a DL control region) and last M symbols in the slot may be used to transmit a UL control channel (hereinafter, a UL control region) where each of N and M is an integer of 0 or greater. A resource region (hereinafter, referred to as a data region) between the DL control region and the UL control region may be used for DL data transmission or for UL data transmission.

For example, one slot may have any one of the following configurations. Each interval is illustrated in chronological order.

1. DL-only configuration
2. UL-only configuration
3. Mixed UL-DL configuration

DL region+guard period (GP)+UL control region

DL control region+GP+UL region

Here, the DL region may be (i) DL data region or (ii) DL control region+DL data region, and the UL region may be (i) UL data region or (ii) UL data region+UL control region.

A PDCCH may be transmitted in the DL control region, and a PDSCH may be transmitted in the DL data region. A PUCCH may be transmitted in the UL control region, and a PUSCH may be transmitted in the UL data region. The PDCCH may carry downlink control information (DCI), for example, DL data scheduling information and UL data scheduling information. The PUCCH may carry uplink control information (UCI), for example, positive acknowledgment/negative acknowledgment (ACK/NACK) information about DL data, channel state information (CSI), and a scheduling request (SR). The GP provides a time gap when the base station and the UE switch from a transmission mode to a reception mode or from the reception mode to the transmission mode. Some symbols at the time of a DL-to-UL switch in a subframe may be set to a GP.

Hereinafter, a method of determining (setting) a resource direction in an integrated access and backhaul (IAB) system is proposed.

First, abbreviations are defined.

IAB: Integrated access and backhaul
CSI-RS: Channel state information reference signal
SFI: Slot format-related information
CORESET: Control resource set
IAB: Integrated access and backhaul
DgNB: Donor gNB
RN: Relay node
D: Downlink
U: Uplink
F (or X): Flexible
AC: Access
BH: Backhaul
DU: Distributed unit
MT: Mobile terminal
CU: Centralized unit In the following description, an IAB node refers to a node capable of supporting radio access of a UE and delivering access traffic to another node (e.g., a base station, a relay, another UE, or the like).

An IAB donor refers to a node providing an interface with a core network to a UE and providing a wireless backhaul function to an IAB node.

The following technology may be used for various radio access systems, such as CDMA, FDMA, TDMA, OFDMA, SC-FDMA, and the like. CDMA may be implemented as radio technologies, such as Universal Terrestrial Radio Access (UTRA) or CDMA2000. TDMA may be implemented as radio technologies, such as Global System for Mobile Communications (GSM)/General Packet Radio Service (GPRS)/Enhanced Data Rates for GSM Evolution (EDGE). OFDMA may be implemented as radio technologies, such as IEEE 802.11 (Wi-Fi), IEEE 802.16 (WiMAX), IEEE 802-20, Evolved UTRA (E-UTRA), and the like. UTRA is part of the Universal Mobile Telecommunications System (UMTS). 3rd Generation Partnership Project (3GPP) Long-Term Evolution (LTE) is part of Evolved UMTS (E-UMTS) using E-UTRA, and LTE-Advanced (LTE-A)/LTE-A Pro is an evolution of 3GPP LTE. 3GPP new radio or new radio access technology (NR) is an evolution of 3GPP LTE/LTE-A/LTE-A Pro.

For clarity, the description will be based on 3GPP communication systems (e.g., LTE-A and NR), but the technical idea of the disclosure is not limited thereto. LTE refers to technology after 3GPP TS 36.xxx Release 8. Specifically, LTE technology after 3GPP TS 36.xxx Release 10 is referred to as LTE-A, and LTE technology after 3GPP TS 36.xxx Release 13 is referred to as LTE-A Pro. 3GPP NR refers to technology after TS 38.xxx Release 15. LTE/NR may be referred to as a 3GPP system. "xxx" means a specified standard document number. LTE/NR may be collectively referred to as a 3GPP system. For a background, terms, abbreviations, and the like used in the description of the disclosure, details stated in standard documents published prior to the disclosure may be referenced.

Hereinafter, integrated access and backhaul (IAB) will be described.

One potential technology to enable future cellular network deployment scenarios and applications is supporting a wireless backhaul and relay link to flexibly and densely deploy NR cells without overcrowding a transport network.

In NR, a massive MIMO or multi-beam system may be basically used/deployed and is expected use a greater bandwidth than in LTE. Thus, an integrated access and backhaul (IAB) link is needed, through which a number of control and data channels/procedures defined to provide access for a UE may be established.

In an IAB environment, collisions between resource directions need to be minimized in order to prevent interference between a plurality of nodes and UEs. For example, it is assumed that a resource for a first UE to transmit an uplink signal to a first node and a resource for a second UE to receive a downlink signal from a second node, which are allocated in the same time and in the same frequency band, are an uplink resource and a downlink resource, respectively. In this case, the uplink signal transmitted by the first terminal using the allocated resource may cause interference in the resource allocated by the second UE.

There may be various interference factors in the IAB environment. However, if at least a resource direction can be defined to minimize interference between a node and a UE, it is possible to guarantee stability and performance of an IAB system.

Figure 18:
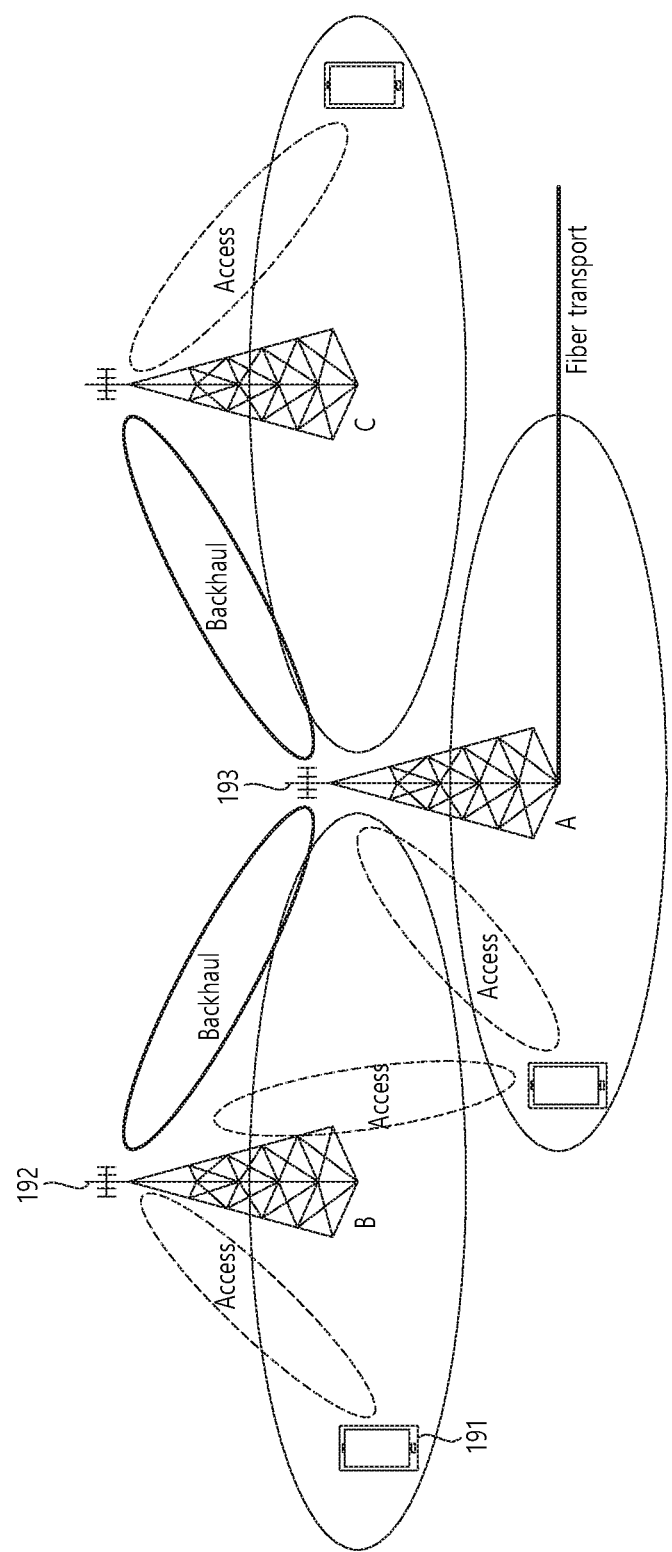
FIG. 18 illustrates one example of a network including integrated access and backhaul (IAB) links.

FIG. 18 illustrates an example of a network including an IAB link.

A radio link between a UE 191 and a relay node or a base station node 192 may be referred to as an access link, and a radio link between the relay node or base station node 192 and a different relay node or base station node 193 may be referred to as a backhaul link. At least one base station node or relay node may be connected to a core network via a cable.

The access link and the backhaul link may use the same frequency band or may use different frequency bands.

Operating an NR system in a millimeter-wave spectrum may incur severe blocking (short-term blocking) that cannot be reduced with a current RRC-based handover mechanism. In order to overcome such blocking, an RAN-based mechanism may be required to enable a quick switch between relay nodes (or base station nodes).

To this end, it is necessary to develop an integrated framework that enables a quick switch between an access link and a backhaul link. Over-the-air coordination between relay nodes may be considered to mitigate interference and to support selection and optimization of an end-to-end path.

IAB for NR needs to consider the following requirements and aspects:

1) Efficient and flexible operation for in-band and out-of-band relays in indoor and outdoor scenarios; 2) multi-hop and redundant connectivity; 3) selection and optimization of an end-to-end path; 4) support of a backhaul link with high spectral efficiency; 5) support of a legacy NR UE.

Figure 19:
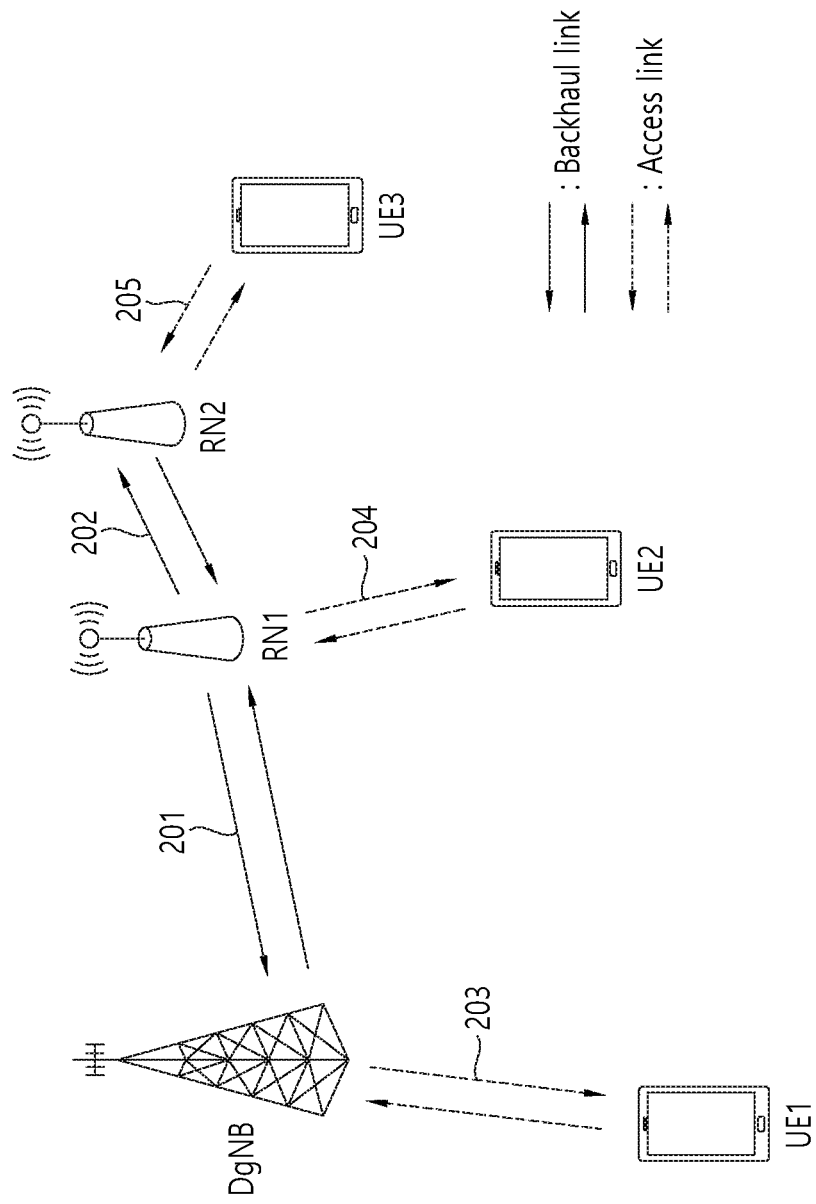
FIG. 19 illustrates a system including a parent node, an IAB node, a child node, and a UE in an IAB environment.

FIG. 19 illustrates a system including a base station, a relay node, and a UE in an IAB environment.

Referring to FIG. 19, half-duplex may be supported in an IAB scenario. Further, full duplex may be supported in the IAB scenario.

If each relay node (RN) does not have scheduling capability, the base station (DgNB) needs to schedule all links among the base station, an associated relay node, and UEs. That is, the base station may collect traffic information from all relevant relay nodes, may determine scheduling for all links, and may report scheduling information to each relay node.

For example, backhaul and access links may be configured as shown in FIG. 19. In this case, the base station may receive not only a scheduling request from UE 1 but also scheduling requests from UE 2 and UE 3. Then, the base station determines scheduling for two backhaul links 201 and 202 and three access links 203, 204, and 205 and may report the scheduling result. This centralized scheduling may have a scheduling delay and a latency issue.

Distributed scheduling may be performed when each relay node has scheduling capability. Scheduling may be immediately performed upon uplink scheduling request from a UE, and backhaul/access links may be flexibly utilized in view of surrounding traffic conditions.

<Discovery and Measurement of Backhaul Link>

Initial Access of IAB Node

An IAB node may follow the same initial access procedure as used for a UE including cell search, system information acquisition, and random access in order to initially establish a connection to a parent IAB node or an IAB donor. SSB/CSI-RS-based RRM measurement may be the start of IAB node discovery and measurement.

To prevent configuration of SSBs causing a collision between IAB nodes and to discover an IAB node on the basis of a CSI-RS, a procedure for discovery between IAB nodes may be considered according to half-duplex constraints and multi-hop topologies. In view of a cell ID used by a given IAB node, two cases may be considered.

Case 1: IAB donor and IAB node share the same cell ID.

Case 2: IAB donor and IAB node maintain separate cell IDs.

Further, a mechanism for multiplexing RACH transmission from a UE and RACH transmission from an IAB node also needs to be considered.

<Measurement of Backhaul Link>

It may be necessary to consider measurement of multiple backhaul links for link management and path selection. To support half-duplex constraints from the perspective of a given IAB node, IAB may support retrieving and measuring candidate backhaul links (after initial access) using resources orthogonal in time to resources used by an access UE for cell search and measurement. Here, the following aspects may be further considered:

1) TDM of SSB (varying depending on, for example, hop order, cell ID, or the like); 2) SSB muting between IAB nodes; 3) multiplexing of SSBs for an access UE and IAB over a half frame or half frames; 4) IAB node discovery signal (e.g., CSI-RS) TDMed with Rel-15 SSB transmission; 5) off-raster SSB use; 6) transmission period for backhaul link detection and measurement, which is different from a period used by an access UE.

It may be necessary to consider a mechanism for coordinating opportunities to transmit and measure a reference signal for IAB nodes. It may also be necessary to improve an SMTC and a CSI-RS configuration for supporting RRM measurement for IAB nodes.

<Backhaul Link Management>

An IAB node may support a mechanism for detecting/recovering a backhaul link failure on the basis of a Rel-15 mechanism. It may be further considered to improve RLM RS- and IAB-related procedures.

<Path Switching or Transmission/Reception Mechanism in Multiple Backhaul Links>

It may be necessary to consider mechanisms for simultaneous and efficient path switching or transmission and reception in multiple backhaul links (e.g., multiple TRP operations and dual connectivity in frequency).

<Scheduling and Resource Allocation/Coordination>

1. Scheduling of Backhaul and Access Links

Downlink transmission of an IAB node (i.e., backhaul-link transmission from the IAB node to a child IAB node and access-link transmission from the IAB node to UEs) may be scheduled by the IAB node itself. Uplink transmission of the IAB node (i.e., transmission from the IAB node to a parent IAB node or IAB donor) may be scheduled by the parent IAB node or IAB donor.

2. Multiplexing of Backhaul and Access Links

In IAB, an IAB may support TDM, FDM, and/or SDM between an access link and a backhaul link, and half duplex constraints may be applied.

It may be necessary to consider an efficient TDM/FDM/SDM multiplexing mechanism for access/backhaul traffic through multi-hop considering the half-duplex constraints of the IAB node.

For various multiplexing options, the following aspects may be considered:

1) a mechanism for orthogonally dividing time slots or frequency resources between access and backhaul links on one or a plurality of hops; 2) use of different DL/UL slot configurations for access and backhaul links; 3) DL and UL power control enhancement and timing requirements allowing FDM and SDM in a panel of backhaul and access links; 4) interference management including mutual interference.

3. Resource Coordination

It may be necessary to consider mechanism for scheduling coordination, resource allocation, and route selection across IAB node/IAB donor and multiple backhaul hops. A semi-static configuration method (in time scale of an RRC signal) may be supported for resources (time in terms of frequency, slot/slot format, or the like) for IAB nodes. The following aspects may be further considered:

1) a distributed or centralized coordination mechanism; 2) granularity of a necessary signaling resource (e.g. TDD configuration pattern); 3) exchange of L1 and/or L3 measurement values between IAB nodes; 4) exchange of information related to topology affecting a study on design of a physical layer of a backhaul link (e.g., hop order); 5) coordination of resources (time, frequency, or the like in terms of slot/slot format or the like) faster than semi-static coordination 4. IAB Node Synchronization and Timing Alignment It may be necessary to consider the effect of feasibility of over-the-air (OTA) synchronization and timing misalignment on IAB performance (e.g., the number of supportable hops). It may be necessary to consider a mechanism for timing alignment in a multi-hop NR-IAB network. IAB can support timing advance (TA)-based synchronization between IAB nodes including a plurality of backhaul hops. It may also be considered to improve an existing timing alignment mechanism.

The following examples of transmission timing alignment between IAB nodes and IAB donors may be taken into consideration.

1) Case 1: DL transmission timing alignment over IAB nodes and IAB donors

2) Case 2: DL and UL transmission timings are aligned within an IAB Node

3) Case 3: DL and UL reception timings are aligned within an IAB Node

4) Case 4: Transmission is performed using Case 2 and reception is performed using Case 3 within an IAB node 5) Case 5: Case 1 is applied to access link timing and Case 4 is applied to backhaul link timing in a different time slot within an IAB node.

The following levels of alignments may be considered within IAB nodes/IAB donors or IAB nodes:

1) Slot-level alignment; 2) Symbol-level alignment; 3) No alignment.

5. Cross link interference (CLI) measurement and management

The impact of cross link interference (CLI) on access and backhaul links (including multi-hop) may be considered.

1) CLI Mitigation Technology

A CLI mitigation technique including advanced receiver and transmitter coordination may be considered. Here, priorities may need to be set in terms of complexity and performance. The CLI mitigation technique needs to be able to manage the following inter-IAB interference scenarios: i) Case 1 where a victim IAB node is performing DL reception via an MT and an interfering IAB node is performing UL transmission via an MT; ii) Case 2 where a victim IAB node is performing DL reception via an MT thereof and an interfering IAB node is performing DL transmission via a DU; iii) Case 3 where a victim IAB node is performing UL reception via a DU and an interfering IAB node is performing UL transmission via an MT; iv) Case 4 where a victim IAB node is performing UL reception via a DU and an interfering IAB node is performing DL transmission via a DU.

When a given IAB node performs FDM/SDM reception between access and backhaul links, interference experienced by the IAB node may be taken into consideration.

2) CLI Measurement Technique

In IAB, to mitigate CLI, it is necessary to consider short-term and long-term measurements and CLI measurements in multiple antennas and beamforming.

1024 QAM may be supported for a backhaul link.

Hereinafter, the disclosure will be described in detail on the basis of the foregoing details.

In the disclosure, access may be used to refer to, for example, a base station-UE connection, and backhaul may be used to refer to, for example, a base station-base station or base station-core network connection. NR may use different radio resources/radio channels for access and backhaul but is also considering using the same radio resource and/or radio channel. For example, radio resources and radio channels that a first base station use to serve UEs connected through an access link may be used for a backhaul link between a first base station and a second base station.

In the foregoing description, terms, such as a base station and a UE, are used for convenience and may be replaced with other terms, for example, a node. For example, it is assumed that a second base station controls/schedules a UE connected to a first base station through an access link via a backhaul link with the first base station (a second base station-first base station-UE form). In this case, for the first base station, the second base station may be referred to as a parent node or a donor node, and the UE may be referred to as a child node. The first base station may be referred to as a relay node (repeater node) or an IAB node. For the second base station, the first base station may be referred to as a child node.

Figure 20:
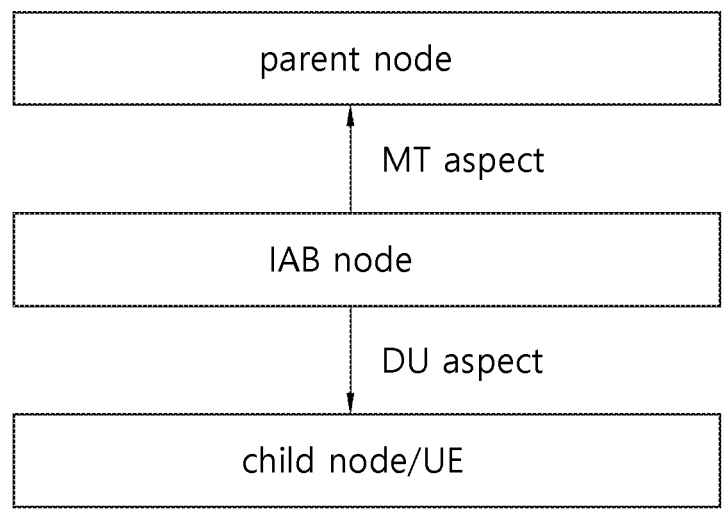
FIG. 20 illustrates nodes in the IAB environment.

FIG. 20 illustrates nodes in an IAB environment.

Referring to FIG. 20, an IAB node may be similar to a UE in a relationship with a parent node, and the parent node may be viewed, for the IAB node, from the perspective of a mobile terminal (MT). In this aspect, the IAB node communicating with the parent node may be referred to as an MT operation of the IAB node.

Further, the IAB node may be similar to a distributed unit (DU), such as a base station or a repeater, in a relationship with a child node, and the child node may be viewed, for the IAB node, from the perspective of the distributed unit (DU). In this aspect, the IAB node communicating with the child node may be referred to as a DU operation of the IAB node.

In the IAB environment, for each node or UE, a symbol direction may be defined in common or separately. That is, a specific unit (e.g., a symbol) of a radio resource may be defined in common or separately. Some of the nodes may be relay nodes (repeaters).

1. Operation Direction Indication

The format of a symbol may be defined to provide the direction of an operation (e.g., transmission or reception) of a node or a UE receiving the format instead of indicating the format of the symbol as a link direction, such as D, U, or X.

That is, the format of the symbol may be indicated as, for example, at least one of transmission (indicated by Tx or T), reception (indicated by Rx or R), and none (indicated by N). These formats have the following meanings.

i) Transmission (Tx or T): May indicate an interval in which the node or the UE transmits a signal regardless of a link.

ii) Reception (Rx or R): May indicate an interval in which the node or the UE receives a signal regardless of a link.

iii) None (None): May indicate an interval in which the node or the UE does not perform any operation.

2. Formats for Access Link and Backhaul Link

In the IAB environment, a new symbol format may be needed to clearly divide resources for an access link and a backhaul link. For example, there are symbol formats A and B, which may have the following meanings:

i) A indicates a symbol available only for an access link;
ii) B indicates a symbol available only for a backhaul link.

When indicating a slot format to a node or UE, not only D, X, and U but also A and B may be additionally indicated or used.

3. Entry for Access Link and/or Backhaul Link

Instead of defining a format separately, an entry of a slot format defined in a standard specification may be defined as an entry for indicating that a resource for an access link or a backhaul link.

For example, Table 3 illustrates formats having an index from 0 to 255 as examples of slot formats, in which formats having indexes of 56 to 255 are 'reserved'. In Table 3, each slot format may be referred to as an entry. When entry 253 of the standard specification (e.g., Table 3) is indicated as one slot format to a node/UE, the node/UE may recognize this entry as a slot format indicating that only a backhaul link is available. Further, when entry 254 of the standard specification (e.g., Table 3) is indicated as one slot format, the node/UE may recognize this entry as a slot format indicating that only an access link is available. An entry number other than the above examples may also be used. According to the main idea of the disclosure, entries indicating resources (e.g., slots) independently used for a backhaul link and an access link may be specified in the standard specification.

4. Search Space for Access Link and/or Backhaul Link

Information about a slot format (slot format information) may be transmitted from a parent node (also referred to as a parent node or, simply, a parent) to a child node (also referred to as a child node or, simply, a child). Further, the slot format information may be transmitted from each node to a UE connected to the node. A search space for transmitting the information about the slot format may be configured. The following options may be considered as a method for configuring the search space.

i) Option 1: Search spaces for control channels carrying slot format information for an access link and a backhaul link may be deployed such that resources do not overlap with each other. Here, resources of CORESETs for the respective links may also not overlap.

ii) Option 2: Search spaces for control channels carrying slot format information for an access link and a backhaul link may be assigned (unconditionally) different monitoring periods.

Option 2-1: When the monitoring periods of the respective search spaces overlap and the resources also overlap, only the search space for the backhaul link may be monitored or it may be assumed to monitor only the search space for the backhaul link.

Option 2-2: When the monitoring periods of the respective search spaces overlap and the resources also overlap, only the search space for the access link may be monitored or it may be assumed to monitor only the search space for the access link.

5. Format Structure

The general format structure of a resource (e.g., symbols in a slot) may have D-X-U in chronological order. The format structure refers to the resource direction of symbol sets in one slot, and D-X-U refers to a structure in which a symbol set D (which may include one or more symbols) is disposed first in a slot, followed by a symbol set X and a symbol set U. To perform uplink transmission, a UE needs a GP and a time to prepare for uplink transmission, and thus a flexible resource is inevitably necessary between D and U.

In IAB, even though a resource direction of any child node (IAB node) is configured to be Rx, the resource may be downlink for a parent node and may be uplink for a UE.

Figure 21:
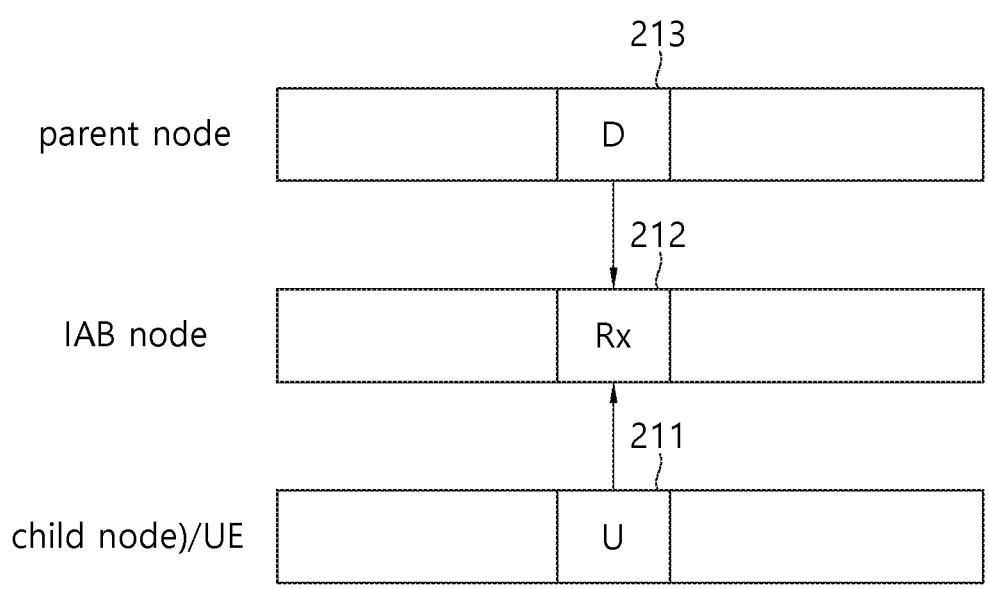
FIG. 21 illustrates a resource direction of an IAB node and resource directions of a parent node and a UE in the IAB environment.

FIG. 21 illustrates a resource direction of each of an IAB node, a parent node, and a UE in IAB.

Referring to FIG. 21, when a resource 212 of an IAB node has a resource direction configured to be Rx, a corresponding resource 213 of a parent node of the IAB node may be configured to be D, and a corresponding resource 211 of a UE connected to the IAB node may be configured to be U.

Even though a resource is for reception from the perspective of one node, the direction of the resource (link direction or resource direction) may be considered differently from the perspective another relevant node/UE. When an operation direction (e.g., Rx) of a particular resource is indicated to a particular node, the particular node may recognize the operation direction of the particular resource, in which both an uplink and a downlink may exist in the particular resource.

Figure 22:
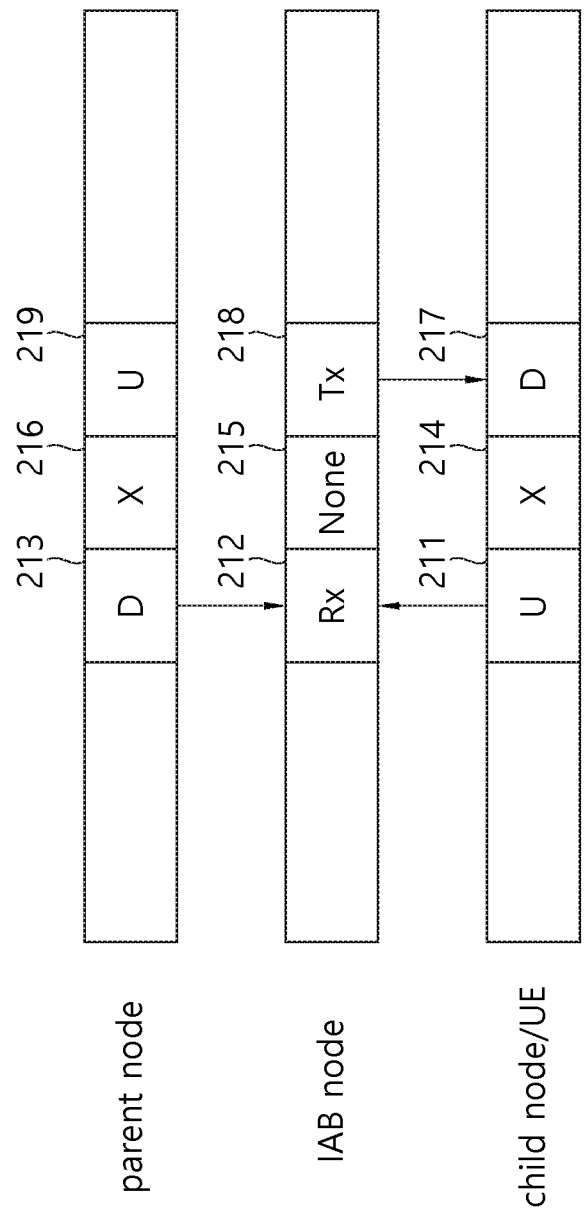
FIG. 22 is another example illustrating a resource direction of an IAB node and resource directions of a parent node and a UE in the IAB environment.

FIG. 22 illustrates another example of a resource direction of each of an IAB node, a parent node, and a UE in IAB.

Referring to FIG. 22, it is assumed that the IAB node receives an operation direction set as Rx-None-Tx for resources 212, 215, and 218. Here, downlink transmission from the parent node or uplink transmission from the child node/UE may be performed in an Rx resource 212. That is, the resource 212 configured as the Rx resource for the IAB node may be configured as a downlink resource 213 for the parent node and as an uplink resource 211 for the child node/UE. The IAB node may indicate a resource direction to the child node or the UE, in which case the IAB node may indicate a format structure of U-X-D for resources 211, 214, and 217. Accordingly, it is necessary to form the format structure of 'U-X-D, and the following options may be considered as additional format structures (i.e., a format structure for one slot).

i) Option 1: Format structure starting with X, ii) Option 2: Format structure of U-D with X between U and D, iii) Option 3: Format structure with X preceding D, iv) Option 4: Format structure with X following U, v) Option 5: Format structure with X inserted before and after a slot format illustrated in Table 3.

Various format structures in the following table may be considered by reflecting at least one of the above options.

| | |
|---|---|
| U - X - D | X - D - X - U - X - D |
| U - D | X - U - D |
| U - D - X | X - U - D - X |
| D - X - U - D | X - U - X - D |
| D - X - U - D - X | X - U - X - D - X |
| D - X - U - X | U - X - D - X |
| D - X - U - X - D | U - D - X |
| D - X - U - X - U | |
| X - D - X - U | |
| X - D - X - U - D | |
| X - D - X - U - D - X | |
| X - D - X - U - D - X - U | |
| X - D - X - U - D - X - U - X | |
| X - D - X - U - X - D | |
| X - D - X - U - X - D - X | |

6. Slot Format Indication Method

For example, when providing dynamic slot format information (SFI), a slot format combination may be indicated on the basis of predetermined slot formats (e.g., defined in the standard specification).

In addition to this method, a resource-direction slot and the number of symbols may be indicated by a method of providing dynamic slot format indicator or slot format information (SFI).

That is, a downlink (D) slot and the number of symbols, an X slot and the number of symbols, and an uplink (U) slot and the number of symbols may be indicated. In addition, since there is an order for the directions, the order of parameters for the respective directions may also be defined.

7. Slot Format Application Timing

When a slot for transmitting slot format information from a base station (gNB) is n, a slot format transmission/reception slot of each node and UE may be defined as a slot n+k. That is, when the slot format information is received in the slot n, the node or the UE may apply a slot format determined on the basis of the information from the slot n+k or a slot n+k+1. Alternatively, the determined slot format may be applied from a slot n+k+a, where a may be determined by the standard specification or may be set by RRC/upper-layer signaling.

When the base station (gNB) defines and transmits a slot format for all child nodes and UEs, time to transmit information indicating the slot format to each node and UE is needed, and thus this process may be required.

8. Soft-Type Time Resource

Generally, there are downlink (D), flexible (F), and uplink (U) directions for a time resource. In the IAB environment, a donor node may allocate resources to all child nodes thereof (i.e., all IAB nodes connected to the donor).

According to one method, the donor node determines semi-static D/U assignment for all the IAB nodes and indicates the assignment to each of the IAB nodes. Here, since it is difficult for the donor node to predict the future data load of each IAB node, the donor node may allocate a resource conditionally available for each IAB node while indicating D/F/U. This resource may be defined as a soft resource. Meanwhile, a hard resource may also be defined. A hard resource may have hard D/F/U, and a soft resource may have soft D/F/U. A hard resource and a soft resource may be defined, for example, as follows.

i) Hard D/F/U: A resource available as a D/F/U resource without any restriction when each IAB node operates as a DU.

ii) Soft D/F/U: A resource that can be activated by a parent node of an IAB node and is available, when activated, the same as a hard resource when the IAB node operates as a DU.

A hard resource and a soft resource are more specifically defined as follows.

A soft resource may also be allocated by the donor node along with a hard resource.

1) Position of Soft Resource

If there is no rule, a region for disposing a soft resource may be determined arbitrarily by the donor node. However, since the availability of a soft resource is determined depending on data load in the near future, deploying a soft resource in a position suitable for use makes it possible for the IAB node to reduce waste of resources. The donor node may dispose a soft resource according to the following rules.

i) Soft D:

Option 1: Soft D may be disposed between hard D and hard F. Option 2: Soft D may be disposed between hard D and soft F.

ii) Soft F: Option 1: Soft F may be disposed between soft D and soft U. Option 2: Soft F may be disposed within hard F (e.g., to overlap with hard F).

iii) Soft U: Option 1: Soft U may be disposed between hard F and hard U. Option 2: Soft U may be disposed between soft F and hard U.

2) Resource Type Indication

Methods for indicating a soft resource to an IAB node may include a method using an RRC parameter and a method using a slot format defined in the standard.

i) Method Using RRC Parameter

Semi-static D/U assignments that a base station indicates to a UE include cell-specific semi-static D/U assignment and/or UE-specific semi-static D/U assignment.

In a cell-specific D/U assignment indication method, a semi-static period, the number (x1) of D slots starting from the start of the period, the number (x2) of D symbols in the next slot, the number (y1) of U slots starting backward from the end of the period, and the number (y2) of U symbols in the next slot are reported.

In a UE-specific D/U assignment indication method, a certain slot in a semi-static period is specified, and the number of D symbols or U symbols starting from the start of the slot is indicated. In the UE-specific D/U assignment indication method, since a resource direction can be defined for one slot, a plurality of UE-specific indications may be defined to UE-specifically indicate for a plurality of slots.

A method for defining a soft resource by applying these methods may be considered.

In a first option (Opt1), when semi-static D/U assignment is indicated by applying the cell-specific method, a hard D-soft D-F-soft U-hard U order may be assumed, and the number of slots for each resource and the number of symbols in the next slot may be indicated.

Here, there may be remaining symbols whose direction is not determined in a slot with x2 and y2 indicated (known), and soft D/U may also be defined for these symbols. For example, when x2 and y2 are indicated to be a number greater than 0 and soft D/U is configured from the next slot, all the symbols may be defined as soft D/U.

Regarding soft D/U, the number of slots and the number of symbols may be indicated using two parameters as in hard D/U.

In a second option (Op2), when semi-static D/U assignment is indicated by applying the UE-specific method, RRC signaling indicating only soft D/F/U may be defined. One slot may be determined to indicate the number of soft D/F/U symbols (index or count) in a slot.

ii) Method Using Slot Format Table

A slot format in slots may be defined including not only hard D/F/U but also soft D/F/U as in Table 3 and may indicated by the donor node to the IAB node, thereby defining soft D/F/U.

<Activation of Soft Resource>

1. Activation Signaling

When a soft resource is defined by a donor node, a parent node of an IAB node may activate the soft resource according to data load thereof and data load of a child node. Here, a method for activating a soft resource will be described.

1) Activation of Single Soft Resource

Resources defined as soft may be defined in a certain unit, and each one soft resource unit may be activated. One soft resource set may be considered as a group of contiguous soft resource symbols. The parent node may determine an index for each soft resource set, and may separately report a particular index to the child node thereof, thus changing a soft resource set corresponding to the particular index into a resource that can be used when the child node operates as a DU. Here, the index may be separately reported by generating a new DCI format or by adding a field to an existing DCI format. Alternatively, an SFI index is transmitted in DCI format 2_0, which may be used to activate a soft resource set.

2) Activation of all Soft Resources

When an activation signal is transmitted, a soft resource may be activated for only one period. Alternatively, an activation period may also be signaled.

Alternatively, a soft resource may be activated for N periods. Here, N may be indicated through an activation signal or may be defined in advance through separate RRC signaling. The activation signal may be separately indicated by generating a new DCI format or by adding a field to an existing DCI format.

2. Activation Through Slot Format Indication Signaling

The parent node may indicate a slot format that clearly defines a resource direction even for a soft region to the child node. The slot format may be indicated by a method using DCI format 2_0.

<Priority Rules for IAB Node>

An IAB node may receive both D/U assignment for a mobile terminal (MT) and D/U assignment for a distributed unit (DU).

FIG. 23 illustrates resource types included in D/U assignment for an MT and resource types included in D/U assignment for a DU which are received by an IAB node.

Referring to FIG. 23, the D/U assignment for the MT includes D/F/U as resource types. A resource denoted by F may be a flexible resource available as a D or U resource. In the D/U assignment for the MT, D may also be referred to as MT-D, U as MT-U, and F as MT-F hereinafter.

The D/U assignment for the DU may include hard D/F/U, soft D/F/U, and not-available (NA) as resource types. That is, one of a total of seven resource types may be indicated for a particular resource.

A hard resource may be a resource that is available always in a direction indicated for the IAB node and a child node, that is, a DU child link.

A soft resource may be a resource of which the availability for the DU child link is explicitly and/or implicitly controlled by a parent node of the IAB node.

For example, hard downlink (H-D) may indicate a resource that is always available for the IAB node to transmit a signal to a child node thereof, and soft downlink (S-D) may indicate a resource through which transmission of a signal by the IAB node to the child node is controlled by the parent node.

Hard uplink (H-U) may indicate a resource that is always available for the IAB node to receive a signal from the child node, and soft uplink (S-U) may indicate a resource through which reception of a signal by the IAB node from the child node is controlled by the parent node.

Hard flexible (H-F) may indicate a resource that is always flexible in a relationship between the IAB node and the child node, and soft flexible (S-F) may indicate a resource of which the flexibility in the relationship between the IAB node and the child node is controlled by the parent node.

Not-available (NA) may indicate a resource that cannot be used in the relationship between the IAB node and the child node.

The D/U assignment for the MT and the D/U assignment for the DU may be defined by the same numerology and parameter but may be defined independently of each other. Although the D/U assignment for the MT and the D/U assignment for the DU may be defined dependently or independently, it may be impossible for a resource-allocating donor node to allocate resource directions enabling all resource-allocated nodes to be completely free of interference (to have zero interference) to the resource-allocated nodes.

Therefore, it is necessary to set a rule for prioritizing the assignments for the IAB node to operate when a collision occurs between the D/U assignment for the MT and the D/U assignment for the DU.

In the D/U assignment for the MT, the following options are possible for D (MT-D):

1) Option 1: All semi-static flexible (F) resources are not counted.

When dynamic SFI is not configured, a semi-static DL or semi-static F resource may be configured as a downlink resource by RRC.

When dynamic SFI is configured, a semi-static DL or a semi-static F resource is configured as a downlink resource by RRC. Here, when dynamic SFI is canceled, the resource may be regarded as not-available (NA) or may be regarded still as MT-D. In the case of a semi-static F resource changed to dynamic D, this change may not be recognized, and thus the resource may not be regarded as MT-D.

2) Option 2: All semi-static F/D resources are regarded as MT-D resources

Similarly, in the case of MT-U, only an F resource changed to UL by RRC may be included or an F resource may be regarded as U. Alternatively, if not indicated by RRC, all F resources may be regarded as DL. Alternatively, MT-D and MT-U may be regarded as semi-static D or U and MT-F (flexible) may be considered. The description is made according to option 1 but is also applicable to option 2 or a case of considering only semi-static D/U.

Hard DU resources may have a higher priority than other resources, for example, resources according to the D/U assignment for the MT and soft DU resources. That is, when the hard resources and the resources according to the D/U assignment for the MT (or soft resources) are set to have different directions, the direction of the hard resources has a higher priority, and a node or UE may perform an operation according to the direction of the hard resources.

Implicit resource direction determination of a soft resource may be performed as follows.

If a soft resource is not explicitly allocated to a UE by RRC configuration or dynamic scheduling, the soft resource may be assumed to be used for a DU.

If a soft resource is explicitly allocated to a UE by RRC configuration or dynamic scheduling, the soft resource may be assumed to be used for the UE.

<Rule 1>

Figure 24:
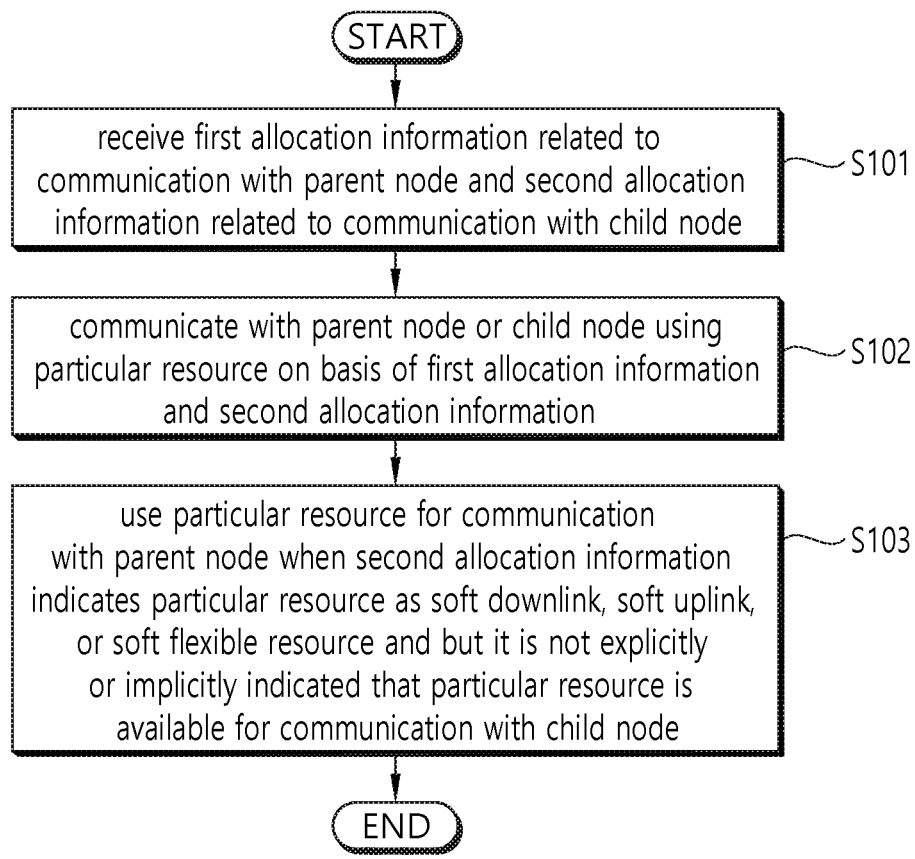
FIG. 24 illustrates a resource use method of a node (IAB node) according to an embodiment of the disclosure.

FIG. 24 illustrates a resource use method of a node (IAB node) according to an embodiment of the disclosure. In FIG. 24, a connection state of a parent node-node (IAB node)-child node connection in an IAB environment is assumed.

Referring to FIG. 24, the IAB node (hereinafter, referred to as a node) receives first allocation information related to communication with the parent node and second allocation information related to communication with the child node (S101). The first allocation information and the second allocation information may be received separately or may be received through one message. When the first allocation information and the second allocation information are received separately, the first allocation information may be received through an upper-layer signal (e.g., an RRC message, or an F1 application protocol (F1AP)), and the second allocation information may be received through a physical-layer signal (DCI received through a PDCCH). Alternatively, the first allocation information may be received through a physical-layer signal (DCI received through a PDCCH), and the second allocation information may be received through an upper-layer signal (e.g., an RRC message). Alternatively, both the first allocation information and the second allocation information may be received through upper-layer signals or through physical-layer signals (pieces of DCI). When the first allocation information and the second allocation information are received through one message, the first allocation information and the second allocation information may be received, for example, through an upper-layer signal, such as an RRC message, or through DCI received through a PDCCH.

The first allocation information may be information (semi-statically/explicitly) indicating resource availability, and the second allocation information may be information (dynamically/explicitly) indicating soft resource availability.

The first allocation information may indicate the resource type of a particular resource as one of three resource types, and the second allocation information may indicate the resource type of the particular resource as one of seven resource types. For example, the first allocation information may be a D/U assignment for an MT illustrated above, and the second allocation information may be a D/U assignment for a DU illustrated above. As described above, the D/U assignment for the MT may indicate (report) the specific resource as any one resource type among downlink (D)/ flexible (F)/uplink (U). The D/U assignment for the DU may indicate (report) the particular resource as one of the seven types: hard D/F/U, soft D/F/U, and not-available (NA). The node may receive the first allocation information and the second allocation information from the parent node (donor node).

The node communicates with the parent node or the child node using the particular resource on the basis of the first allocation information and the second allocation information Here, the resource type of the particular resource indicated (reported) by the first allocation information and the resource type of the particular resource indicated (reported) by the second allocation information may not necessarily be equal. That is, the resource type of the particular resource indicated (reported) by the first allocation information and the resource type of the particular resource indicated (reported) by the second allocation information may be different or collide. In this case, a processing method may be an issue.

According to the disclosure, for example, when the second allocation information indicates the particular resource as a hard resource that is always available for communication with the child node, the node can use the particular resource for the communication with the child node regardless of the first allocation information.

When the second allocation information indicates the resource as a soft downlink, soft uplink, or soft flexible resource and the resource is allocated to the node by the first allocation information, the resource may be considered to be used for the communication with the parent node.

When the second allocation information indicates the resource as a soft resource (e.g., a soft downlink, soft uplink, or soft flexible resource) but it is not explicitly indicated/ performed at the same time. The following table illustrates the operation of a node (IAB node) given a D/U assignment for a DU (referred to as a DU configuration for convenience) and a D/U assignment for an MT (referred to as an MT configuration for convenience).

TABLE 7

| DU configuration | MT configuration | | |
|---|---|---|---|
| | DL | UL | F |
| DL-H | DU: Transmission<br>MT: NULL | DU: Transmission<br>MT: NULL | DU: Transmission<br>MT: NULL |
| DL-S | When DU resource: IA<br>DU: Transmission<br>MT: Null<br>When DU resource: INA<br>DU: Null<br>MT: Reception | When DU resource: IA<br>DU: Transmission<br>MT: Null<br>When DU resource: INA<br>If DU: Null<br>MT: Transmission | When DU resource: IA<br>DU: Transmission<br>MT: Null<br>When DU resource: INA<br>If DU: Null<br>MT: Transmission/Reception |
| UL-H | DU: Reception<br>MT: Null | DU: Reception<br>MT: Null | DU: Reception<br>MT: Null |
| UL-S | When DU resource: IA<br>DU: Reception<br>MT: Null<br>When DU resource: INA<br>DU: Null<br>MT: Reception | When DU resource: IA<br>DU: Reception<br>MT: Null<br>When DU resource: INA<br>DU: Null<br>MT: Transmission | When DU resource: IA<br>DU: Reception<br>MT: Null<br>When DU resource: INA<br>DU: Null<br>MT: Transmission/Reception |
| F-H | DU: Transmission/Reception<br>MT: Null | DU: Transmission/Reception<br>MT: Null | DU: Transmission/Reception<br>MT: Null |
| F-S | When DU resource: IA<br>DU: Transmission/Reception<br>MT: Null<br>When DU resource: INA<br>DU: Null<br>MT: Reception | When DU resource: IA<br>DU: Transmission/Reception<br>MT: Null<br>When DU resource: INA<br>DU: Null<br>MT: Transmission | When DU resource: IA<br>DU: Transmission/Reception<br>MT: Null<br>When DU resource: INA<br>DU: Null<br>MT: Transmission/Reception |
| NA | DU: Null<br>MT: Reception | DU: Null<br>MT: Transmission | DU: Null<br>MT: Transmission/Reception | signaled that the resource is available for the communication with the child node (i.e., a DU operation), the resource may be used for the communication with the parent node (an MT operation) (S103).

Performing an MT operation in a soft resource may be allowed not only when there is an explicit indication but also when there is no explicit indication. Accordingly, the IAB node will have more opportunities to monitor a PDCCH from the parent node.

If it is not allowed to perform an MT operation in a soft resource when there is no explicit indication, there may be a problem when a DU configuration for the IAB node includes no NA resource. In this case, the IAB node may not be able to monitor a PDCCH and may thus not receive an L1 (physical-layer) signal for a resource configuration available for a DU soft resource, thus having a problem in communication with the parent node.

Alternatively, when the second allocation information indicates the resource as a soft downlink, soft uplink, or soft flexible resource and the resource is not explicitly allocated to the node by the first allocation information, the resource may be considered to be used for the communication with the child node.

When the second allocation information indicates the resource as a soft resource (e.g., a soft downlink, soft uplink, or soft flexible resource) but it is not explicitly/implicitly indicated/signaled that the resource is available for the communication with the parent node (i.e., an MT operation), the resource may be used for the communication with the child node (e.g., a DU operation).

For example, in a TDM operation, transmission by the IAB node as a DU and transmission by the IAB node as an MT may not be performed at the same time, and reception as the DU and reception as the MT may also not be In the table, DU may indicate an operation between the IAB node and a child node, MT may indicate an operation between the IAB node and a parent node.

Specifically, in the table, "MT: Transmission" may mean that a UE (MT or child node) needs to perform transmission if scheduled. "DU: Transmission" may mean that the IAB node (i.e., a DU) may perform transmission. "MT: Reception" may mean that the MT needs to be able to perform reception (if there is anything to receive). "DU: Reception" may mean that the IAB node (DU) may schedule uplink transmission from the child node or UE. "MT: Transmission/ Reception" may mean that the UE (child node) needs to perform transmission if scheduled and needs to be able to perform reception, but not simultaneously. "DU: Transmission/Reception" may mean that the IAB node (DU) may perform transmission and may schedule uplink transmission from the child node or UE, but not simultaneously. "IA" may mean that a resource for the IAB node (DU) is explicitly or implicitly indicated as available.

"INA" may mean that a resource for the IAB node (DU) is explicitly or implicitly indicated as not available.

"MT: Null" may indicate that the UE (MT or child node) does not perform transmission and does not need to be able to perform reception. "DU: Null" may mean that the IAB node (DU) does not perform transmission and does not schedule uplink transmission from the child node or UE.

The table may be for an IAB environment where a full-duplex operation is not possible.

Figure 25:
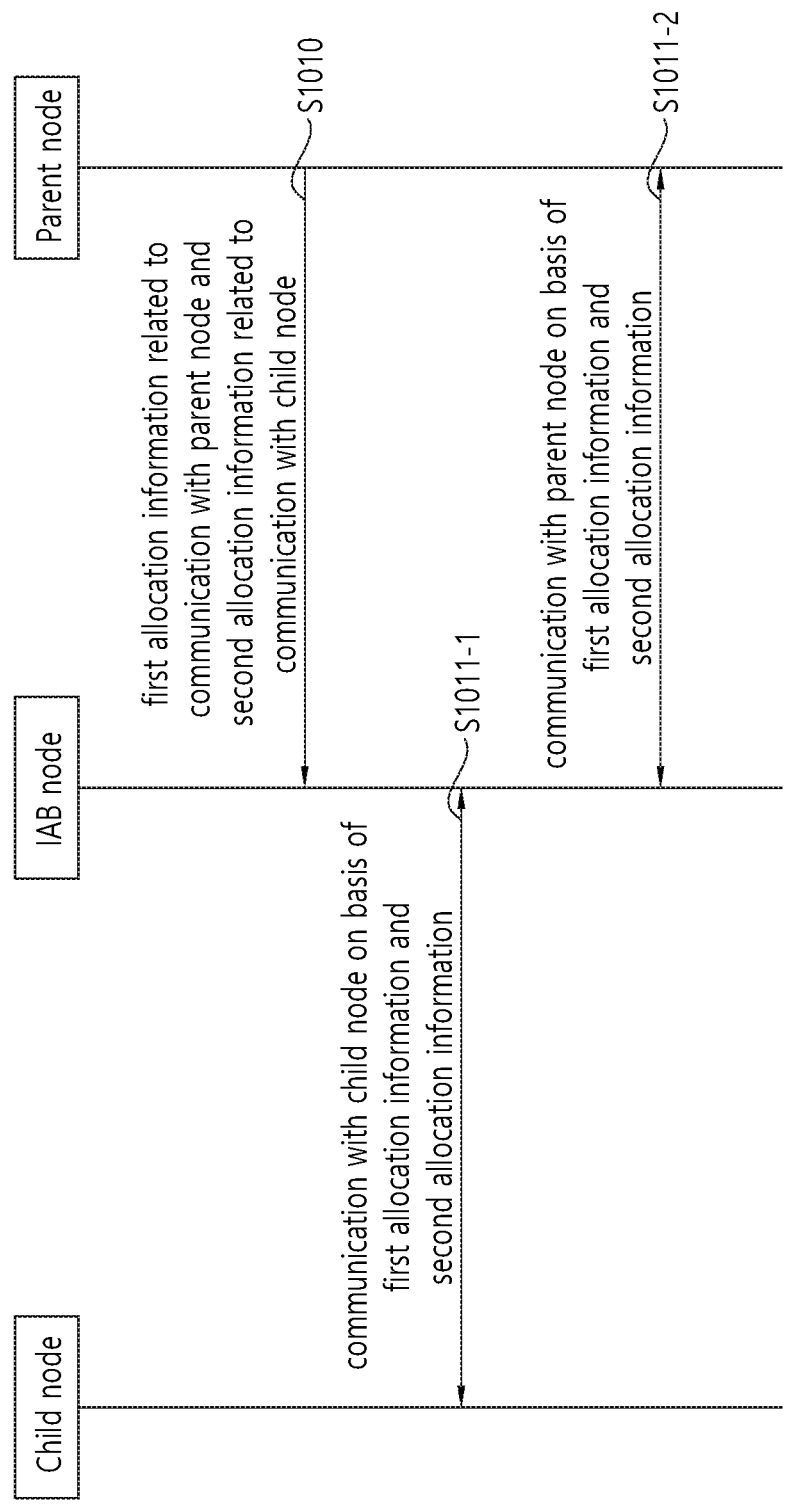
FIG. 25 illustrates an operating method of each node in a wireless communication system including a child node, an IAB node, and a parent node.

FIG. 25 illustrates an operating method of each node in a wireless communication system including a child node, an IAB node, and a parent node.

Referring to FIG. 25, the IAB node receives first allocation information related to communication with the parent node and second allocation information related to communication with the child node from the parent node (S1010).

The IAB node communicates with the child node (S1011-1) or communicates with the parent node (S1011-2) on the basis of the first allocation information and the second allocation information.

Here, as described above with reference to FIG. 24, when the second allocation information indicates a particular resource as a hard resource that is always available for communication with the child node, the node can use the particular resource for the communication with the child node regardless of the first allocation information.

When the second allocation information indicates the resource as a soft downlink, soft uplink, or soft flexible resource and the resource is allocated to the node by the first allocation information, the resource may be considered to be used for the communication with the parent node.

Alternatively, when the second allocation information indicates the resource as a soft downlink, soft uplink, or soft flexible resource and the resource is not explicitly allocated to the node by the first allocation information, the resource may be considered to be used for the communication with the child node.

FIG. 26 illustrates a method of using a resource related to communication with a child node.

Referring to FIG. 26, an IAB node determines whether a resource related to communication with a child node is indicated as a hard resource by resource allocation information (e.g., the aforementioned second allocation information) (S251). The resource allocation information (i.e., a D/U assignment for a DU) may indicate the resource as one of seven types of hard D/F/U, soft D/F/U, and not-available (NA).

When the resource is indicated as a hard resource, the IAB node may perform the communication with the child node (i.e., a DU operation) (S252).

When the resource is not indicated as a hard resource, the IAB node may determine whether the resource is indicated as a soft resource (S253).

When the resource is not indicated as a soft resource, the resource is indicated as not-available (NA), and thus the IAB node cannot use the resource for the communication with the child node (S254).

When the resource is indicated as a soft resource: if it is not explicitly/implicitly indicated that the soft resource can be used for the communication with the child node, the IAB node may use the resource for communication with a parent node (an MT operation); if indicated, the IAB node may use the resource for the communication with the child node (S255).

The same IAB node may be referred to as a DU when performing a DU operation, that is, communication with a child node, and may be referred to as an MT when performing an MT operation, that is, communication with a parent node. When a resource is set to 'not available (NA)', the DU may not assume that the resource is used. In the case of hard DU resources, the DU may assume that the hard DU resources are available regardless of an MT configuration.

In the case of soft DU resources, when a soft DU resource is indicated as available, the DU may assume that the soft DU resource is available. When a soft resource is not indicated as available, the DU may not assume that the soft resource is available. Use of a soft resource may include transmission/reception of a specific signal and channel (e.g., a PDSCH/PUSCH) by the DU.

Both implicit and explicit indications about the availability of a soft resource may be supported. When the availability of a soft DU resource is implicitly indicated, the IAB node knows that the DU resource is available without affecting transmission/reception capabilities of the MT according to a configuration and scheduling based on an indirect method. The method may be, for example: 1) a lack of uplink scheduling grants in the MT; 2) no data available for MT transmission; 3) a configured MT search space; and 4) a set RS measurement time (e.g. SSB/CSI-RS).

It may be explicitly indicated that a resource is available on the basis of a DCI indication. In this case, the following options may be considered: 1) an indication similar to SFI via DCI format 2_0; 2) using two SFI indications (e.g., on the basis of a multi-slot scheduling mechanism); and 3) using a newly defined DCI format.

In summary, when a DU resource is explicitly set to hard, a DU operation may be performed; when the DU resource is set to NA, an MT operation may be performed.

When the DU resource is explicitly set to soft and is explicitly set to IA, the DU operation may be performed; when the DU resource is explicitly set to soft and is set to INA, the MT operation may be performed.

When the DU resource is explicitly set to soft and IA/INA is not explicitly set, the MT operation may be performed if the MT operation is required, and the DU operation may be performed otherwise.

Hereinafter, a processing method for the case where a collision occurs about the resource type of the same resource between a D/U assignment for an MT (first allocation information) and a D/U assignment for a DU (second allocation information) will be described with reference to specific examples.

1. When colliding with MT-D.

DU-hard D: The resource may operate with priority on DU-hard D. That is, an MT-D resource may be considered as unavailable for the MT.

DU-soft D: The resource may operate with priority on MT-D. That is, a DU-soft D resource may be considered as unavailable.

DU-hard U: The resource may operate with priority on DU-hard U. That is, the MT-D resource may be considered as an MT-D/DU-U when an IAB supports FDM/SDM. Otherwise, the MT-D resource may be considered as unavailable.

DU-soft U: The resource may operate with priority on MT-D. That is, the MT-D resource may be considered as MT-D/DU-U when the IAB supports FDM/SDM. Otherwise, the resource (DU-soft U) may be considered as unavailable.

DU-hard F: This resource is a flexible resource for the IAB node. Thus, when the IAB supports FDM/SDM, the resource may be set as MT-D/DU-U according to MT-D; otherwise, the resource may be set as a DU resource, assuming that the resource is not available for the MT.

DU-soft F: With priority on MT-D, the resource may be set as MT-D/DU-U according to MT-D when the IAB supports FDM/SDM; otherwise, the resource may be set as an MT resource, assuming that the resource is not available for the DU.

DU-NA: An MT function of MT-D may be assumed. Since the resource is not used by the DU, the MT function may be performed without priority, which can be applied to all resources not available for the DU. A similar method may be applied to MT-U.

2. When colliding with MT-U.

DU-hard D: The resource may operate with priority on DU-hard D.

DU-soft D: The resource may operate with priority on MT-U.

DU-hard U: The resource may operate with priority on DU-hard U.

DU-soft U: The resource may operate with priority on MT-U.

The D/U assignments may have a collision therebetween but may also have a collision with a semi-static resource configuration, such as a PDSCH, a PUCCH, or a PUSCH, set by a CORESET, a CSI-RS, a grant-free resource, or an upper layer. When this configuration is received by the MT and has a collision with resources for the DU, the following rules may be applied.

1) When colliding with an MT downlink configuration (e.g., a PDSCH set by a CORESET, a CSI-RS, or an upper layer) in MT-F DU-hard D: The resource may operate with priority on DU-hard D.

DU-soft D: The resource may operate with priority on the MT downlink configuration.

DU-hard U: The resource may operate with priority on DU-hard U.

DU-soft U: The resource may operate with priority on the MT downlink configuration.

2) When colliding with an MT uplink configuration (e.g., a PUCCH or PUSCH set by a grant-free resource or upper layer) in MT-F DU-hard D: The resource may operate with priority on DU-hard D.

DU-soft D: The resource may operate with priority on MT-U.

DU-hard U: The resource may operate with priority on DU-hard U.

DU-soft U: The resource may operate with on the MT uplink configuration.

<Rule 2>

When a collision occurs among MT-D, DU-hard D/U, and DU-soft D/U, the resource may operate always with priority on MT-D. That is, the resource may be regarded as MT-D to operate.

When a collision occurs among MT-U, DU-hard D/U, and DU-soft D/U, the resource may operate always with priority on MT-U. That is, the resource may be regarded as MT-U to operate.

When an MT downlink configuration (e.g., a PDSCH set by a CORESET, a CSI-RS, or an upper layer) in MT-F has a collision with DU-hard D/U or DU-soft D/U, the resource operates always with priority on the MT downlink configuration in option 1, while the resource operates always with priority on the DU assignment in option 2.

When an MT uplink configuration (e.g., a PUCCH or PUSCH set by a grant-free resource or upper layer) in MT-F has a collision with DU-hard D/U or DU-soft D/U, an operation is always performed with priority on the MT uplink configuration in option 1, while an operation is always performed with priority on the DU assignment in option 2.

<Rule 3>

When a collision occurs between MT D/U and DU-hard F, the resource may operate for the MT since it is unclear whether DU-hard F is used in option 1. That is, the MT D/U receives priority. In option 2, since DU-hard F may be used by the DU for scheduling, the resource may operate for the DU, disregarding MT D/U.

When a collision occurs between MT D/U and DU-soft F, the resource may operate for the MT.

When a collision occurs between MT D/U and DU-NA, the resource may operate for the MT.

<Rule 4>

Between a UE (MT) and a node (DU), 1) Option 1: a connection with a parent node always has priority, and thus an MT operation may always take precedence over a DU operation, and 2) Option 2: a connection with a child node always has priority for service maintenance, and thus a DU operation may always take precedence over an MT operation.

<Rule 5>

Between MT soft resources and DU soft resources, Option 1: an MT operation may take precedence since soft resources are unavailable when maintained as DU-soft, and Option 2: since it is not known when a signal to activate a soft resource is received from a parent node or an activation signal is received but may be missed, an MT operation may not be performed in the soft resource.

Between MT hard resources and DU hard resources, Option 1: a connection with a parent node always has priority, and thus an MT operation may always take precedence over a DU operation, and Option 2: a connection with a child node always has priority for service maintenance, and thus a DU operation may always take precedence over an MT operation.

<Rule 6>

Between an MT resource configuration in MT F and a DU soft resource, Option 1: a connection with a parent node always has priority, and thus a resource may always operate according to the MT resource configuration, and Option 2: a connection with a child node always has priority for service maintenance, and thus a DU operation may always take precedence over an MT operation.

Between an MT resource configuration for a UE and a DU F resource, Option 1: a connection with a parent node always has priority, and thus a resource may always operate according to the MT resource configuration, and Option 2: a connection with a child node always has priority for service maintenance and the resource may be scheduled for DU F, and thus the MT resource configuration may be ignored.

<Priority Rule for Child Node of DU>

Since the resource is a soft resource for a DU, it is important whether the DU can set the resource. Further, the DU has a soft resource configuration, but it is important whether the MT can also see the soft resource configuration.

A soft resource is not immediately available for the DU but may be considered as an available resource. Further, since a resource configuration may be set regardless of whether a resource is actually available, a soft resource section cannot be assumed to have no configuration. That is, the DU may configure a semi-static resource, such as a PDSCH, a PUCCH, and a PUSCH set by a CORESET, a CSI-RS, a grant-free resource, or an upper layer separately from a soft resource (or a donor node may perform this configuration instead of the DU), and the position of this configured resource may overlap with that of the soft resource.

If a child node (or UE) of the DU knows a D/F/U resource structure to be used by the DU (including soft and NA resources) and also receives the corresponding configuration, the child node may perform the following operations.

1) The child node (or UE) of the DU may immediately implement a downlink configuration in soft D. 2) The child node (or terminal) of the DU may prepare uplink transmission when there is an uplink configuration in soft U. Here, although preparing uplink transmission, the child node does not perform uplink transmission when there is no indication of hard D before the transmission (transmission time considering a TA), and may perform transmission when there is an indication of hard D or uplink scheduling is received.

3) The child node (or UE) of the DU may immediately implement a downlink configuration existing in soft F, and may prepare uplink transmission when there is an uplink configuration. Although preparing uplink transmission, the child node does not perform uplink transmission when there is no indication of hard D before the transmission (transmission time considering a TA), and may perform transmission when there is an indication of hard D or uplink scheduling is received.

<Not-Available Resource>

An unavailable resource may be defined as a resource that is not available for a DU when an IAB node operates as the DU. Unlike a soft resource, an unavailable resource may be defined as a resource that is never available even though the DU receives additional signaling. This definition may be determined and transmitted by a donor node, and the IAB node may arbitrarily use resources other than this resource. When there is a soft resource and the soft resource is activated by a parent node, the soft resource may be used.

1. Position of not-Available Resource

The IAB node may operate as both an MT and a DU, and a D/U assignment for the MT and a D/U assignment for the DU may be different. However, it is not necessary to indicate a resource unavailable for the DU through information about the D/U assignment for the MT, because an MT operation needs to be performed only as scheduled by the parent node. Defining a resource unavailable for the DU in a resource the operation of which for the MT is unclear may make it possible to minimize confusion between MT and DU operations. That is, a resource unavailable for the DU in a flexible resource for the MT may be defined by the donor node.

The aforementioned methods may be performed by at least one of the devices illustrated in FIG. 3 to FIG. 6.

What is claimed is:

1. A resource use method of a node in a wireless communication system, the method comprising:
   receiving first allocation information related to communication with a parent node and second allocation information related to communication with a child node; and
   communicating with the parent node or the child node using a particular resource based on the first allocation information and the second allocation information,
   wherein based on the second allocation information informing the particular resource as a soft resource among a hard resource, the soft resource and an unavailable resource and based on no explicit indication that the particular resource is available for the communication with the child node, the particular resource is used for the communication with the parent node.

2. The method of claim 1, wherein the first allocation information informs that a resource type of the particular resource is one of downlink, uplink, and flexible.

3. The method of claim 1, wherein the second allocation information informs that a resource type of the particular resource is one of hard downlink, soft downlink, hard uplink, soft uplink, hard flexible, soft flexible, and not-available.

4. The method of claim 3, wherein the hard downlink informs that the particular resource is a resource that is always available for the node to transmit a signal to the child node, and the soft downlink informs that the particular resource is a resource through which transmission of a signal by the node to the child node is controlled by the parent node.

5. The method of claim 3, wherein the hard uplink informs that the particular resource is a resource that is always available for the node to receive a signal from the child node, and the soft uplink informs that the particular resource is a resource through which reception of a signal by the node from the child node is controlled by the parent node.

6. The method of claim 3, wherein the hard flexible informs that the particular resource is a resource that is always flexible in a relationship between the node and the child node, and the soft flexible informs that the particular resource is a resource of which the flexibility in the relationship between the node and the child node is controlled by the parent node.

7. The method of claim 3, wherein the not-available informs that the particular resource is a resource that is unavailable in a relationship between the node and the child node.

8. The method of claim 1, wherein based on the second allocation information informing the resource as a soft downlink, soft uplink, or soft flexible resource and the resource being allocated to the node by the first allocation information, the resource is considered to be used for the communication with the parent node.

9. The method of claim 1, wherein based on the second allocation information informing the resource as a soft downlink, soft uplink, or soft flexible resource and the resource not being allocated to the node by the first allocation information, the resource is considered to be used for the communication with the child node.

10. The method of claim 1, wherein the first allocation information and the second allocation information are received from the parent node.

11. The method of claim 1, wherein the child node is a UE connected to the node.

12. The method of claim 1, wherein based on the second allocation information informing the particular resource as a hard resource that is always available for communication with the child node, the particular resource is used for the communication with the child node regardless of the first allocation information.

13. A node comprising:
   a transceiver to transmit and receive a radio signal; and
   a processor coupled with the transceiver to operate,
   wherein the processor receives first allocation information related to communication with a parent node and second allocation information related to communication with a child node; and
   communicates with the parent node or the child node using a particular resource based on the first allocation information and the second allocation information,
   wherein based on the second allocation information informing the particular resource as a soft resource among a hard resource, the soft resource and an unavailable resource and based on no explicit indication that the particular resource is available for the communication with the child node, the particular resource is used for the communication with the parent node.

14. An operating method of a parent node in a wireless communication system, the method comprising:
   transmitting first allocation information related to communication with a node and second allocation information related to communication with a child node of the node and the node; and communicating with the node using a particular resource based on the first allocation information and the second allocation information, wherein based on the second allocation information informing the particular resource as a soft resource among a hard resource, the soft resource and an unavailable resource and based on no explicit indication that the particular resource is available for the communication with the child node, the particular resource is used for the communication with the parent node.

\* \* \* \* \*